United States Patent
Jung et al.

(10) Patent No.: US 10,735,926 B2
(45) Date of Patent: Aug. 4, 2020

(54) METHOD FOR OPERATING TERMINAL IN WIRELESS COMMUNICATION SYSTEM AND TERMINAL USING THE SAME

(71) Applicant: LG ELECTRONICS INC., Seoul (KR)

(72) Inventors: Sunghoon Jung, Seoul (KR); Youngdae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/077,442

(22) PCT Filed: Feb. 13, 2017

(86) PCT No.: PCT/KR2017/001553
§ 371 (c)(1),
(2) Date: Aug. 10, 2018

(87) PCT Pub. No.: WO2017/138796
PCT Pub. Date: Aug. 17, 2017

(65) Prior Publication Data
US 2019/0037592 A1    Jan. 31, 2019

Related U.S. Application Data

(60) Provisional application No. 62/294,296, filed on Feb. 11, 2016.

(51) Int. Cl.
*H04W 4/46*    (2018.01)
*H04W 36/00*   (2009.01)
(Continued)

(52) U.S. Cl.
CPC ............ *H04W 4/46* (2018.02); *H04W 8/005* (2013.01); *H04W 28/0278* (2013.01);
(Continued)

(58) Field of Classification Search
None
See application file for complete search history.

(56) References Cited

U.S. PATENT DOCUMENTS

2006/0198341 A1* 9/2006 Singh .................... H04W 36/12
370/331
2010/0257423 A1* 10/2010 Kim ........................ H04L 1/16
714/749
(Continued)

FOREIGN PATENT DOCUMENTS

EP    1701574    9/2006
EP    2739087    6/2014
(Continued)

OTHER PUBLICATIONS

PCT International Application No. PCT/KR2017/001553, International Search Report dated May 18, 2017, 2 pages.
(Continued)

*Primary Examiner* — Joseph A Bednash
(74) *Attorney, Agent, or Firm* — Lee, Hong, Degerman, Kang & Waimey

(57) ABSTRACT

Provided is a method for operating a transmission buffer in a wireless communication system. The method is performed by a user equipment (UE), and comprises detecting, in a switching layer, whether a transmission of data on a first transmission link is successful via the lower layer, determining whether to keep the transmission of the data on the first transmission link or to perform the transmission of the data on a second transmission link when the transmission of the data is not successful and performing the transmission of the data on the determined transmission link.

10 Claims, 25 Drawing Sheets

(51) Int. Cl.
*H04W 28/02* (2009.01)
*H04W 72/14* (2009.01)
*H04W 80/02* (2009.01)
*H04W 80/08* (2009.01)
*H04W 8/00* (2009.01)

(52) U.S. Cl.
CPC ........... *H04W 36/03* (2018.08); *H04W 72/14* (2013.01); *H04W 80/02* (2013.01); *H04W 80/08* (2013.01)

(56) References Cited

U.S. PATENT DOCUMENTS

| | | | |
|---|---|---|---|
| 2013/0039314 A1* | 2/2013 | Prateek | H04W 74/08 370/329 |
| 2014/0179330 A1 | 6/2014 | Du et al. | |
| 2015/0296411 A1 | 10/2015 | Meyer et al. | |
| 2017/0188410 A1* | 6/2017 | Yaver | H04W 28/08 |

FOREIGN PATENT DOCUMENTS

| | | |
|---|---|---|
| KR | 20140073346 | 6/2014 |
| WO | 2009051386 | 4/2009 |
| WO | 2015174781 | 11/2015 |
| WO | 2016004979 | 1/2016 |

OTHER PUBLICATIONS

European Patent Office Application Serial No. 17750488.3, Search Report dated Jul. 22, 2019, 11 pages.

3rd Generation Partnership Project (3GPP), "Technical Specification Group Radio Access Network; Evolved Universal Terrestrial Radio Access (E-UTRA); Medium Access Control (MAC) protocol specification (Release 12)," 3GPP TS 36.321 V12.5.0, Mar. 2015, 77 pages.

* cited by examiner

METHOD FOR OPERATING TERMINAL IN WIRELESS COMMUNICATION SYSTEM AND TERMINAL USING THE SAME

CROSS-REFERENCE TO RELATED APPLICATIONS

This application is the National Stage filing under 35 U.S.C. 371 of International Application No. PCT/KR2017/001553, filed on Feb. 13, 2017, which claims the benefit of U.S. Provisional Application No. 62/294,296, filed on Feb. 11, 2016 the contents of which are all hereby incorporated by reference herein in its entirety.

BACKGROUND OF THE INVENTION

Field of the Invention

The present invention relates to wireless communications, and more particularly, to a method and apparatus for performing switching control between uplink (UL) and sidelink (SL) in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Vehicle-to-everything (V2X) communication is the passing of information from a vehicle to any entity that may affect the vehicle, and vice versa. This information exchange can be used for a host of safety, mobility and environmental applications to include driver assistance and vehicle safety, speed adaptation and warning, emergency response, safety, traveler information, navigation, traffic operations and demand management, personal navigation, commercial fleet planning and payment transactions. There is significant societal benefit and commercial value to delivering safety, mobility and convenience applications that rely on V2X.

V2X applications span a host of media. Basic elements of V2X are the vehicle and its connectivity to any other intelligent transportation system (ITS) station. Therefore, V2X includes transceivers located on vehicles, mounted on the roadside infrastructure, in aftermarket devices, or within handheld devices. V2X communication may occur in some of contexts of vehicle to vehicle (V2V) communication, vehicle to infrastructure (V2I) communication, vehicle to pedestrian (V2P) (or other vulnerable road users) communication, or vehicle to home communication (V2H).

The wide variety of use cases cannot only be met with a short-range radio solution working in a peer to peer manner. Some V2X use cases require infrastructure assistance for communication, and some use cases can make use of smaller scale infrastructure such as small cells or methods such as relaying. For this, the 3GPP has a role to play in defining, examining and acting on the variety of use cases to support the V2X effort. 3GPP infrastructure and 3GPP proximity-based services (ProSe) can act in support and enhancement to dedicated short range communications (DSRC) to fulfil many use cases. There is also the opportunity for 3GPP to investigate modifications and enhancements to ProSe to meet or improve the performance of short range communications in terms of spectral efficiency, effective range, bandwidth and throughput, error resiliency, and improved latency.

Accordingly, various methods for performing V2X communication based on 3GPP technology needs to be defined.

SUMMARY OF THE INVENTION

The present invention provides a method and apparatus for performing switching control between uplink (UL) and sidelink (SL) in a wireless communication system. The present invention provides a method and apparatus for determining one of UL or SL based on received control information for transmission direction of a specific type of communication. The present invention provides a method and apparatus for performing vehicle-to-everything (V2X) communication via either UL or SL. The present invention provides a method and apparatus for operating a transmission buffer in a wireless communication system.

In an aspect, a method for operating a transmission buffer in a wireless communication system is provided. The method is performed by a user equipment (UE) and comprises detecting, in a switching layer, whether a transmission of data on a first transmission link is successful via the lower layer, determining whether to keep the transmission of the data on the first transmission link or to perform the transmission of the data on a second transmission link when the transmission of the data is not successful, and performing the transmission of the data on the determined transmission link.

The UE may operate a transmission buffer for the switching layer and a transmission buffer for the determined transmission link when performing the transmission of the data.

When the UE performs the transmission of the data on the second transmission link, the UE may reset a transmission buffer for the first transmission link.

The UE may cancel the Buffer Status Report (BSR) of the first transmission link.

The UE may pass the data stored in the transmission buffer for the switching layer to a transmission buffer for the second transmission link.

When the transmission buffer for the determined transmission link contains data related to control for the switching layer as well as data not related to control for the switching layer, the UE may not reset the transmission buffer for the determined transmission link.

The data related to control for the switching layer may be data for Vehicle to X (V2X), and the data not related to control for the switching layer is data transmitted via an uplink.

The first transmission link may be an uplink, and the second transmission link may be a sidelink, and if the transmission of the data on the uplink is not successful via the lower layer, the UE may determine to perform the transmission of the data on the sidelink.

The first transmission link may be a sidelink, and the second transmission link may be an uplink, and if the transmission of the data on the sidelink is not successful via the lower layer, the UE may determine to perform transmission of the data on the uplink.

The lower layer may indicate to the switching layer whether the transmission of the data on the first transmission link is successful via the lower layer.

The lower layer may be a layer in which the first transmission link and the second transmission link are branched and distinguished.

The lower layer may be a Packet Data Convergence Protocol (PDCP) layer, a Radio Link Control (RLC) layer, a Medium Access Control (MAC) layer, or a Physical (PHY) layer.

The lower layer may be a transmission link selection and management layer.

The UE may be a Vehicle to X (V2X) UE and the data is V2X data.

In another aspect, A user equipment (UE) is provided. The UE comprises a Radio Frequency (RF) unit that transmit and receive a radio signal and a processor coupled to the RF unit and configured to operate, and the process further that: detects, in a switching layer, whether a transmission of data on a first transmission link is successful via the lower layer, determines whether to keep the transmission of the data on the first transmission link or to perform the transmission of the data on a second transmission link when the transmission of the data is not successful, and performs the transmission of the data on the determined transmission link.

Transmission direction for V2X communication can be determined effectively. And, operating a transmission buffer in a wireless communication system can be controlled effectively.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
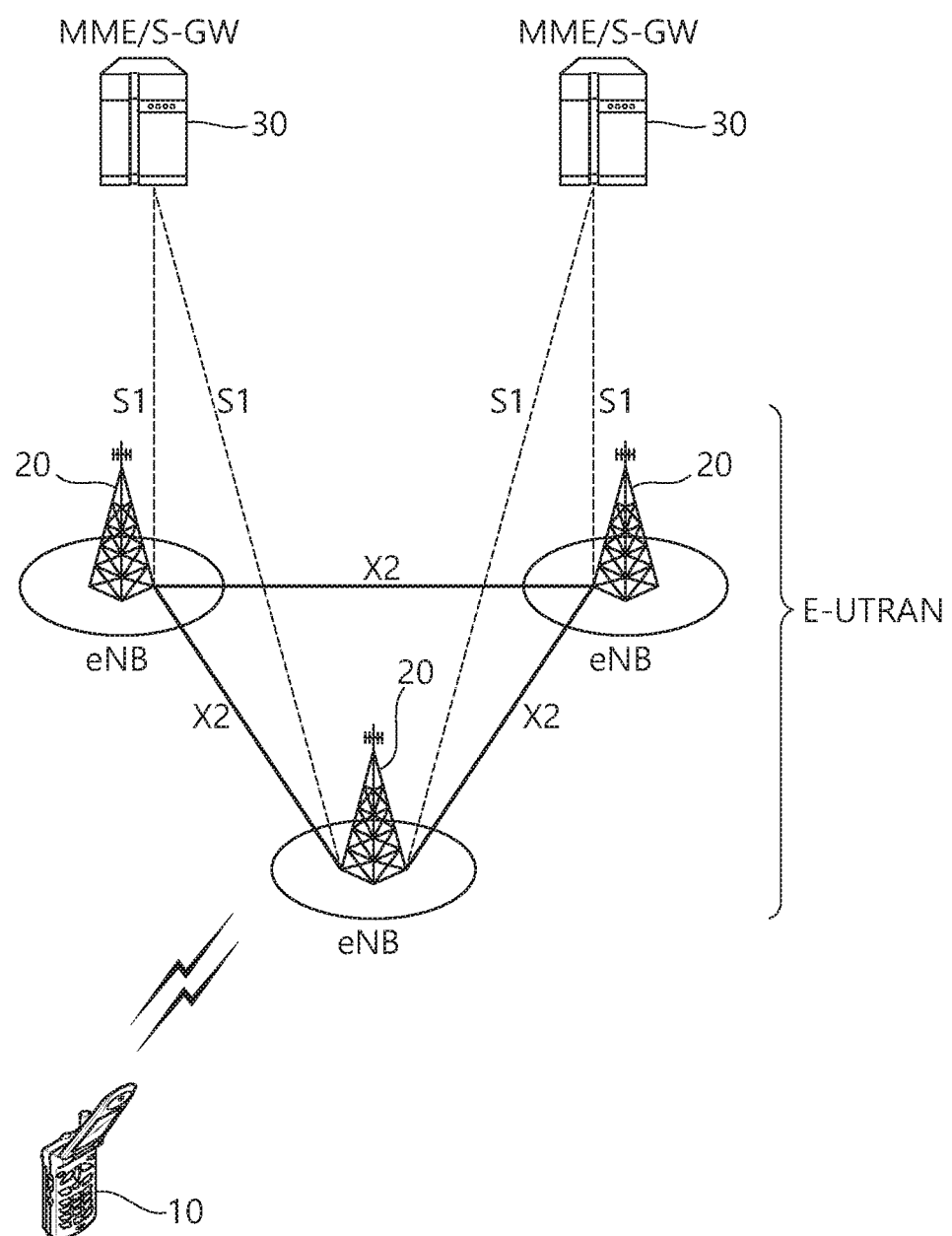
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a system architecture evolution (SAE) gateway (S-GW). The MME/S-GW 30 may be positioned at the end of the network and connected to an external network. For clarity, MME/S-GW 30 will be referred to herein simply as a "gateway," but it is understood that this entity includes both the MME and S-GW.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an Si interface.

Figure 2:
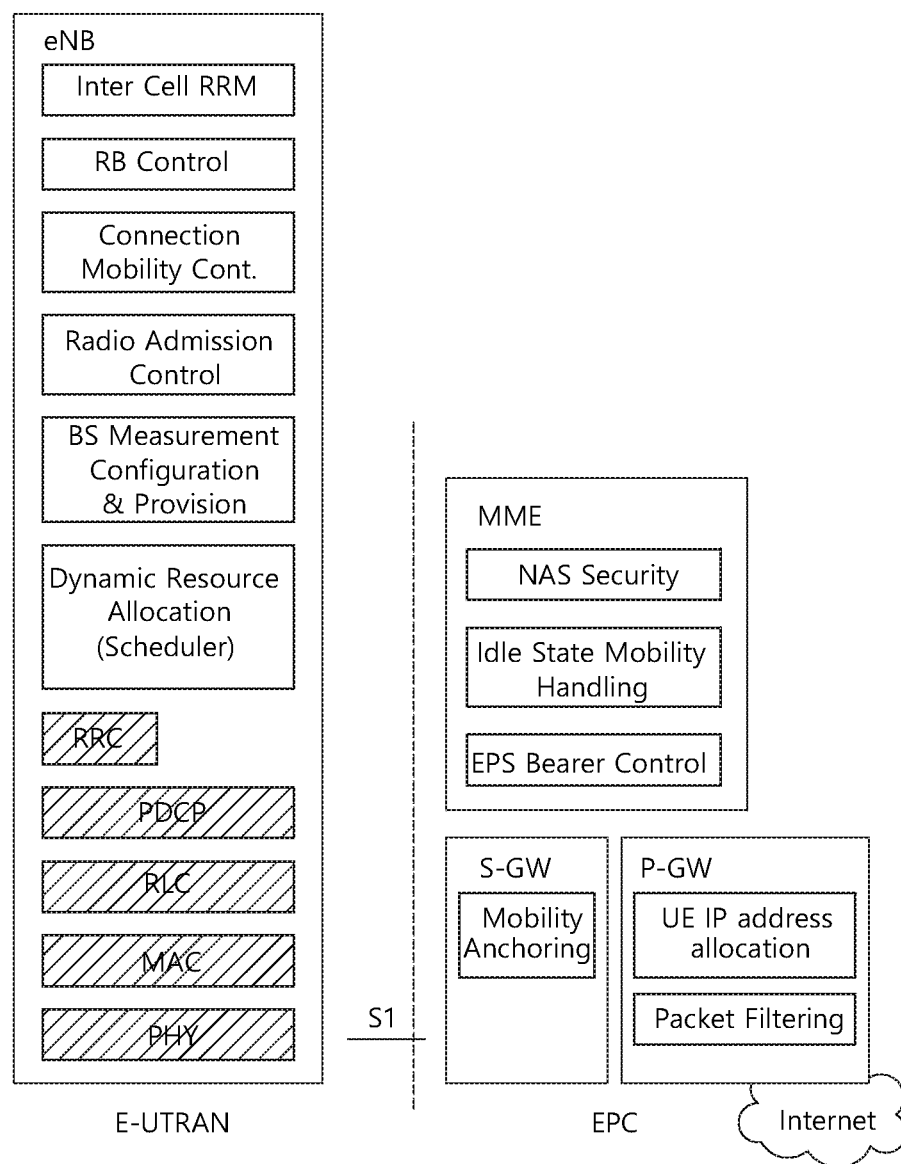
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
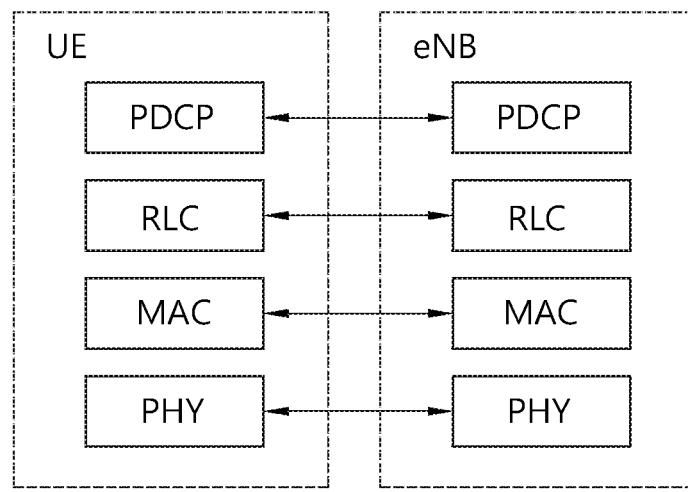
FIG. 3 shows a block diagram of a user plane protocol stack of an LTE system.
Figure 4:
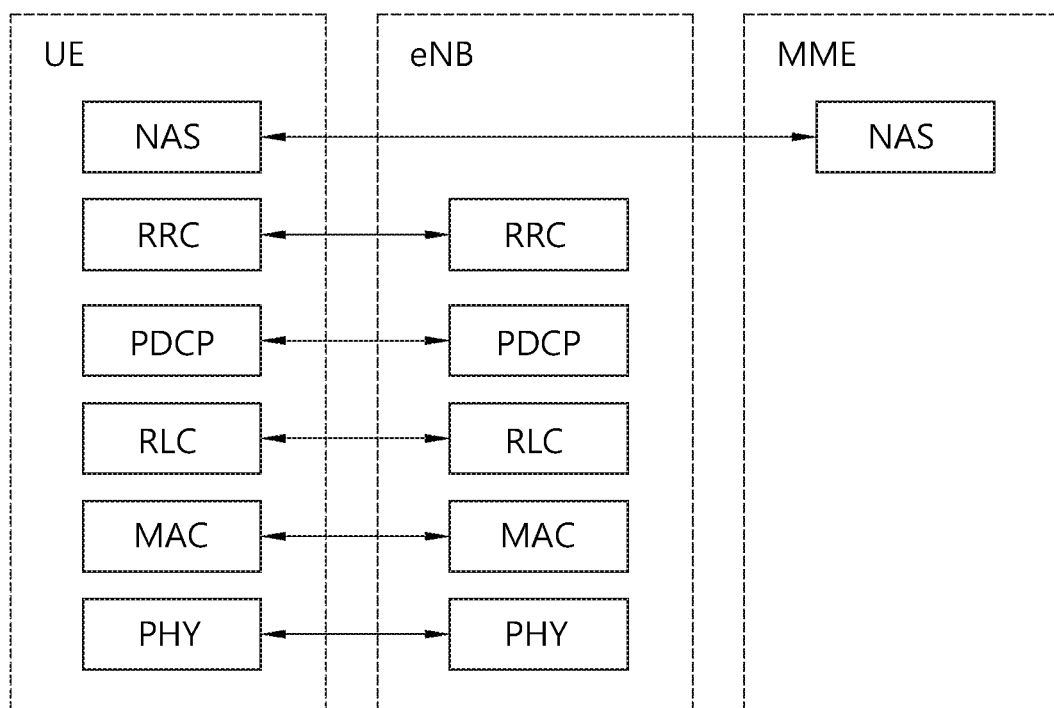
FIG. 4 shows a block diagram of a control plane protocol stack of an LTE system.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel A physical channel is mapped to the transport channel Data between the MAC layer and the PHY layer is transferred through the transport channel Between different PHY layers, i.e. between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or IPv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Figure 5:
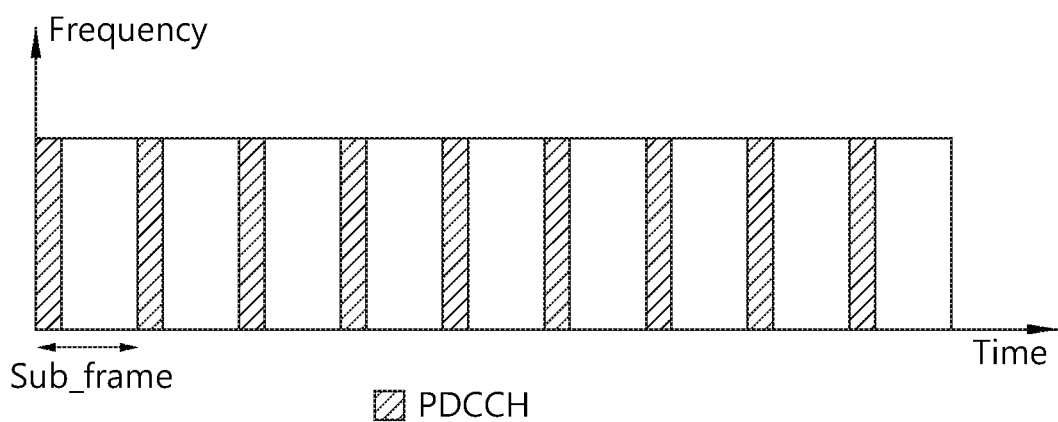
FIG. 5 shows an example of a physical channel structure.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

Figure 6:
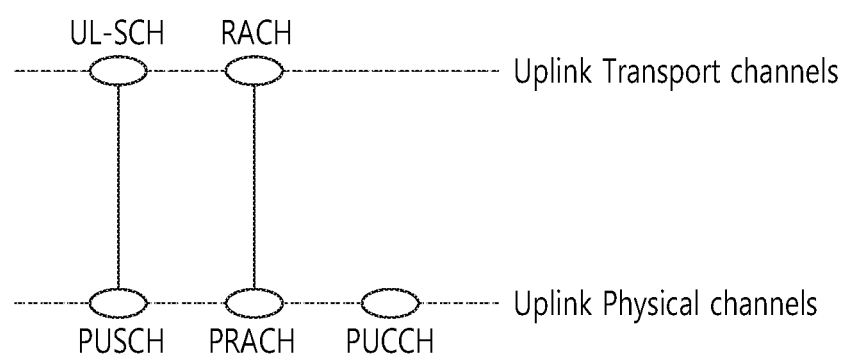
FIG. 6 shows mapping between UL transport channels and UL physical channels.

FIG. 6 shows mapping between UL transport channels and UL physical channels. Referring to FIG. 6, an uplink shared channel (UL-SCH) may be mapped to a physical uplink shared channel (PUSCH). The UL-SCH may be characterized by:
  possibility to use beamforming;
  support for dynamic link adaptation by varying the transmit power and potentially modulation and coding;
  support for HARQ;
  support for both dynamic and semi-static resource allocation.

Further, a random access channel (RACH) may be mapped to a physical random access channel (PRACH). The RACH may be characterized by:
  limited control information;
  collision risk.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Figure 7:
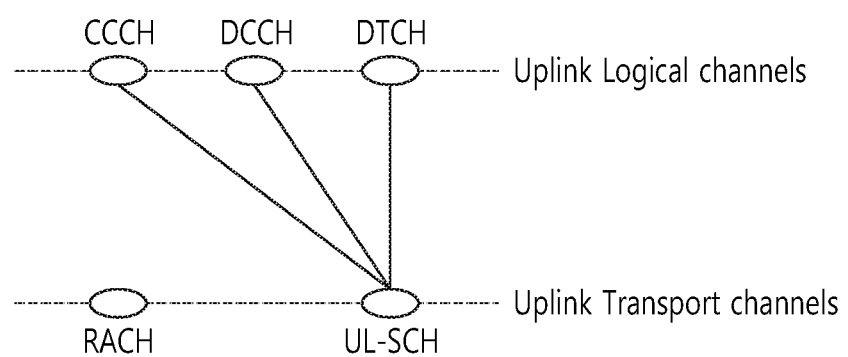
FIG. 7 shows mapping between UL logical channels and UL transport channels.

FIG. 7 shows mapping between UL logical channels and UL transport channels. Referring to FIG. 7, the CCCH may be mapped to the UL-SCH. The DCCH may be mapped to the UL-SCH. The DTCH may be mapped to the UL-SCH.

An RRC state indicates whether an RRC layer of the UE is logically connected to an RRC layer of the E-UTRAN.

The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Proximity-based services (ProSe) are described. "ProSe" may be used mixed with "D2D". ProSe direct communication means a communication between two or more UEs in proximity that are ProSe-enabled, by means of user plane transmission using E-UTRA technology via a path not traversing any network node. ProSe-enabled UE means a UE that supports ProSe requirements and associated procedures. Unless explicitly stated otherwise, a ProSe-enabled UE refers both to a non-public safety UE and a public safety UE. ProSe-enabled public safety UE means a ProSe-enabled UE that also supports ProSe procedures and capabilities specific to public safety. ProSe-enabled non-public safety UE means a UE that supports ProSe procedures and but not capabilities specific to public safety. ProSe direct discovery means a procedure employed by a ProSe-enabled UE to discover other ProSe-enabled UEs in its vicinity by using only the capabilities of the two UEs with 3GPP LTE rel-12 technology. EPC-level ProSe discovery means a process by which the EPC determines the proximity of two ProSe-enabled UEs and informs them of their proximity ProSe UE identity (ID) is a unique identity allocated by evolved packet system (EPS) which identifies the ProSe enabled UE. ProSe application ID is an identity identifying application related information for the ProSe enabled UE.

Sidelink (SL) is UE to UE interface for ProSe direct communication and ProSe direct discovery. The sidelink corresponds to the PC5 interface. Sidelink comprises ProSe direct discovery and ProSe direct communication between UEs. Sidelink uses UL resources and physical channel structure similar to UL transmissions. Sidelink transmission uses the same basic transmission scheme as the UL transmission scheme. However, sidelink is limited to single cluster transmissions for all the sidelink physical channels. Further, sidelink uses a 1 symbol gap at the end of each sidelink sub-frame.

Figure 8:
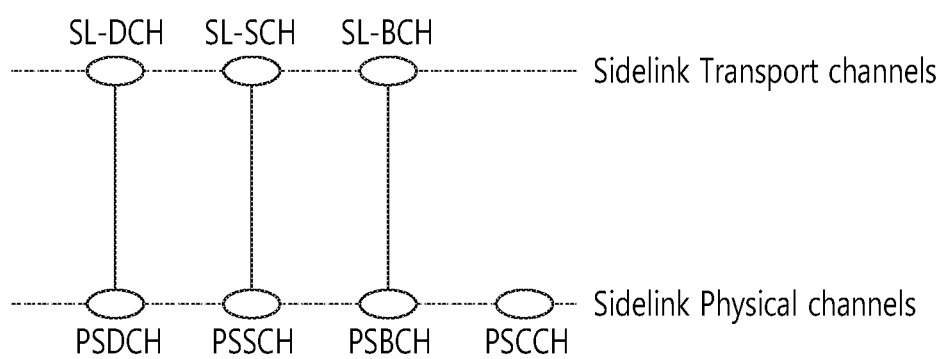
FIG. 8 shows mapping between SL transport channels and SL physical channels.

FIG. 8 shows mapping between SL transport channels and SL physical channels. Referring to FIG. 8, a SL discovery channel (SL-DCH) may be mapped to a physical SL discovery channel (PSDCH), which carries ProSe direct discovery message from the UE. The SL-DCH is characterized by:

fixed size, pre-defined format periodic broadcast transmission;

support for both UE autonomous resource selection and scheduled resource allocation by eNB;

collision risk due to support of UE autonomous resource selection; no collision when UE is allocated dedicated resources by the eNB.

Further, a SL shared channel (SL-SCH) may be mapped to a physical SL shared channel (PSSCH), which carries data from a UE for ProSe direct communication. The SL-SCH is characterized by:

support for broadcast transmission;

support for both UE autonomous resource selection and scheduled resource allocation by eNB;

collision risk due to support of UE autonomous resource selection; no collision when UE is allocated dedicated resources by the eNB;

support for HARQ combining, but no support for HARQ feedback;

support for dynamic link adaptation by varying the transmit power, modulation and coding.

Further, a SL broadcast channel (SL-BCH) may be mapped to a physical SL broadcast channel (PSBCH), which carries system and synchronization related information transmitted from the UE. The SL-BCH is characterized by pre-defined transport format.

A physical SL control channel (PSCCH) carries control from a UE for ProSe direct communication. The PSCCH is mapped to the SL control resources. The PSCCH indicates resource and other transmission parameters used by a UE for PSSCH.

Figure 9:
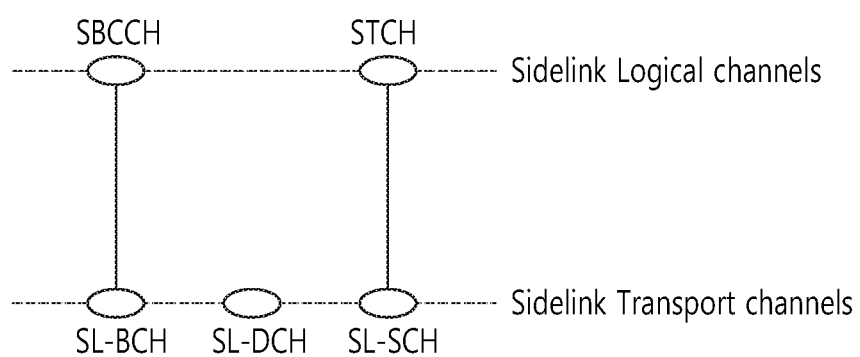
FIG. 9 shows mapping between SL logical channels and SL transport channels for ProSe direct communication.

FIG. 9 shows mapping between SL logical channels and SL transport channels for ProSe direct communication. Referring to FIG. 9, a SL broadcast control channel (SBCCH) may be mapped to the SL-BCH. The SBCCH is a SL channel for broadcasting SL system information from one UE to other UE(s). This channel is used only by ProSe direct communication capable UEs. Further, a SL traffic channel (STCH) may be mapped to the SL-SCH. The STCH is a point-to-multipoint channel, for transfer of user information from one UE to other UEs. This channel is used only by ProSe direct communication capable UEs.

The vehicular communication, referred to as vehicle-to-everything (V2X), contains three different types, which are vehicle-to-vehicle (V2V) communications, vehicle-to-infrastructure (V2I) communications, and vehicle-to-pedestrian (V2P) communications. These three types of V2X can use "co-operative awareness" to provide more intelligent services for end-users. This means that transport entities, such as vehicles, roadside infrastructure, and pedestrians, can collect knowledge of their local environment (e.g. information received from other vehicles or sensor equipment in proximity) to process and share that knowledge in order to provide more intelligent services, such as cooperative collision warning or autonomous driving.

V2X service is a type of communication service that involves a transmitting or receiving UE using V2V application via 3GPP transport. Based on the other party involved in the communication, it can be further divided into V2V service, V2I service, V2P service. V2V service is a type of V2X service, where both parties of the communication are UEs using V2V application. V2I service is a type of V2X Service, where one party is a UE and the other party is a road side unit (RSU) both using V2I application. The RSU is an entity supporting V2I service that can transmit to, and receive from a UE using V2I application. RSU is implemented in an eNB or a stationary UE. V2P service is a type of V2X service, where both parties of the communication are UEs using V2P application.

For V2V, E-UTRAN allows such UEs that are in proximity of each other to exchange V2V-related information using E-UTRA(N) when permission, authorization and proximity criteria are fulfilled. The proximity criteria can be configured by the mobile network operator (MNO). However, UEs supporting V2V service can exchange such information when served by or not served by E-UTRAN which supports V2X Service. The UE supporting V2V applications transmits application layer information (e.g. about its location, dynamics, and attributes as part of the V2V service). The V2V payload must be flexible in order to accommodate different information contents, and the information can be transmitted periodically according to a configuration provided by the MNO. V2V is predominantly broadcast-based. V2V includes the exchange of V2V-related application information between distinct UEs directly and/or, due to the limited direct communication range of V2V, the exchange of V2V-related application information between distinct UEs via infrastructure supporting V2X service, e.g., RSU, application server, etc.

For V2I, the UE supporting V2I applications sends application layer information to RSU. RSU sends application layer information to a group of UEs or a UE supporting V2I applications. Vehicle-to-network (V2N) is also introduced where one party is a UE and the other party is a serving entity, both supporting V2N applications and communicating with each other via LTE network.

For V2P, E-UTRAN allows such UEs that are in proximity of each other to exchange V2P-related information using E-UTRAN when permission, authorization and proximity criteria are fulfilled. The proximity criteria can be configured by the MNO. However, UEs supporting V2P service can exchange such information even when not served by E-UTRAN which supports V2X Service. The UE supporting V2P applications transmits application layer information. Such information can be broadcast by a vehicle with UE supporting V2X service (e.g., warning to pedestrian), and/or by a pedestrian with UE supporting V2X service (e.g., warning to vehicle). V2P includes the exchange of V2P-related application information between distinct UEs (one for vehicle and the other for pedestrian) directly and/or, due to the limited direct communication range of V2P, the exchange of V2P-related application information between distinct UEs via infrastructure supporting V2X service, e.g., RSU, application server, etc.

Figure 10:
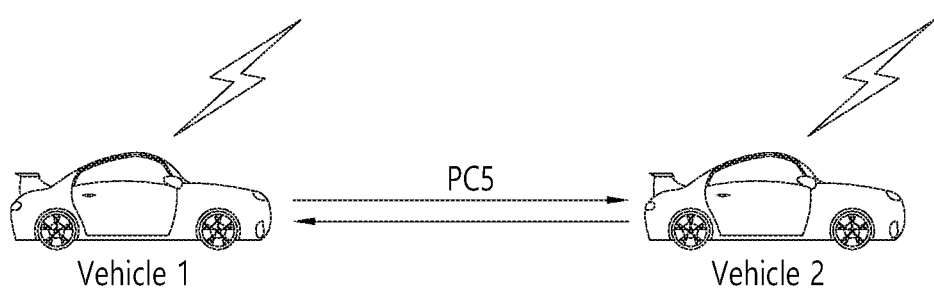
FIG. 10 shows an example of a scenario of V2X communication.

FIG. 10 shows an example of a scenario of V2X communication. Referring to FIG. 10, vehicle 1 and vehicle 2 are communicated with each other directly via PC5 interface.

Figure 11:
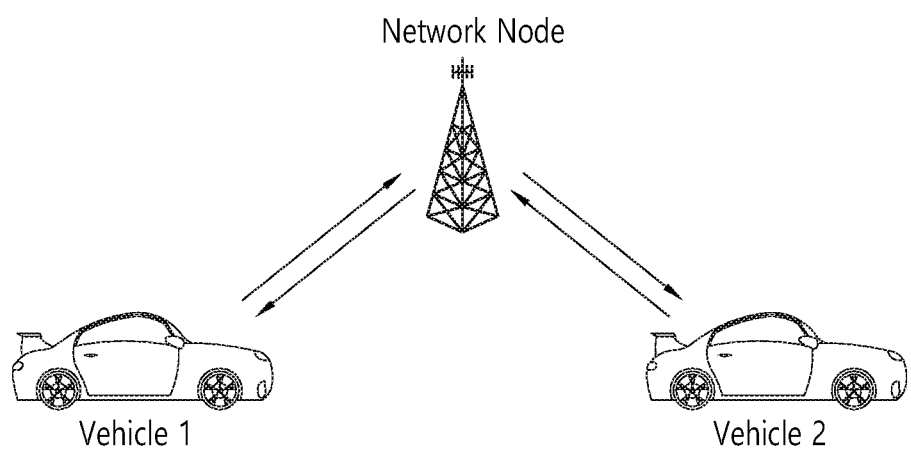
FIG. 11 shows another example of a scenario of V2X communication.

FIG. 11 shows another example of a scenario of V2X communication. Referring to FIG. 11, vehicle 1 and vehicle 2 are communicated with each other indirectly via the network. The network node may be one of an eNB, a new entity for V2X communication, a new gateway for V2X communication, a RSU, etc. The network node may not be the MME or S-GW.

Figure 12:
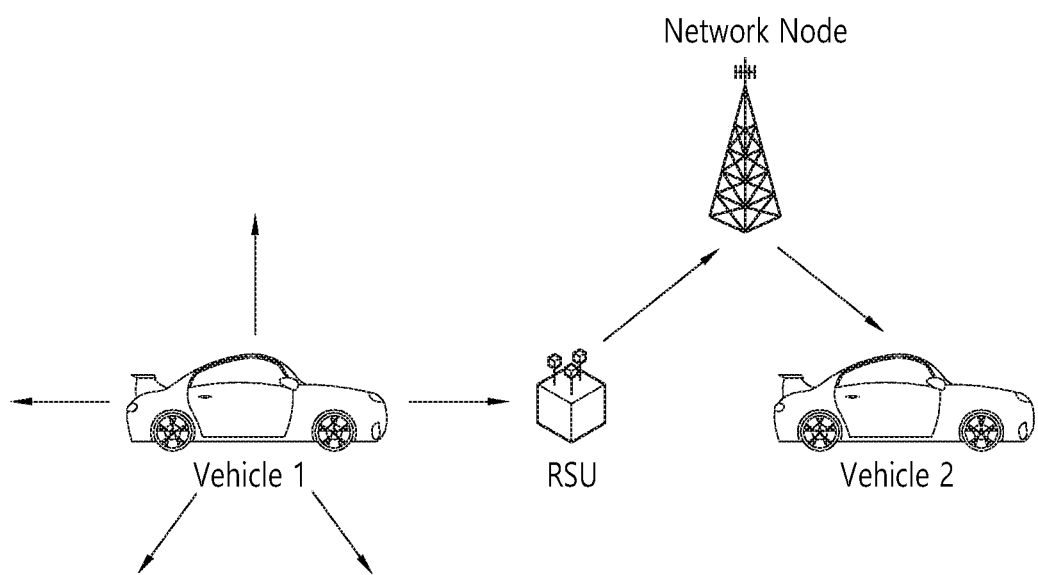
FIG. 12 shows another example of a scenario of V2X communication.

FIG. 12 shows another example of a scenario of V2X communication. Referring to FIG. 12, vehicle 1 broadcasts data, and the RSU receives the broadcast data. The RSU and vehicle 2 are communicated with each other indirectly via the network. The network node may be one of an eNB, a new entity for V2X communication, a new gateway for V2X communication, a RSU, etc. The network node may not be the MME or S-GW.

As described above, in 3GPP rel-12, ProSe allows a UE to discover another UE within an authorized range either directly or with the network assistance. The discovery process is under network control, and provides additional service related information to the discoverer UE. In addition, for public safety use, the UEs within the allowed range are able to directly communicate with each other using group based communication. Further in 3GPP rel-13, there are plans for further enhancements to ProSe to support restricted discovery and targeted discovery, in which the user is able to control who can discover him/her, and to operate in a mode to only announce upon a request. The one-to-one communication and relay support are also considered to be added for direct communication.

All these features can find a good application in the V2X use cases. However, in 3GPP rel-12 and rel-13, the ProSe has been designed for use with pedestrian mobility speed. It would therefore not be able to be used directly for V2X. For example, the physical channel assumptions may not be suitable for direct discovery and communication in vehicle speed, and UE to network signaling delays would limit its usefulness for V2X Enhancements are necessary to adapt the ProSe system to support V2X.

When the current ProSe is used for V2X communication, the following problems may occur.

(1) In urban area, the number of vehicles is expected to be large. In such dense scenario, there may be many vehicles that transmit road safety messages on SL, so that SL resources may be highly utilized and collision probability will be normally high. Such problem will cause unstable intelligent transportation system (ITS) service to vehicles. In this sense, offloading ITS traffic from SL to another direction may be beneficial.

(2) V2V and V2I communication may normally happen in a local area. V2V and V2I communication may not aim at a specific user. Rather, this communication may be open to all neighboring vehicles in a local area. In addition, such communication will require lower latency. Thus, fast broadcast mechanism may be needed.

In order to solve the problem described above, according to an embodiment of the present invention, a method for performing switching control between UL and SL for V2X communication may be proposed. According to an embodiment of the present invention, transmission direction between UL and SL may be selected under network control.

Figure 13:
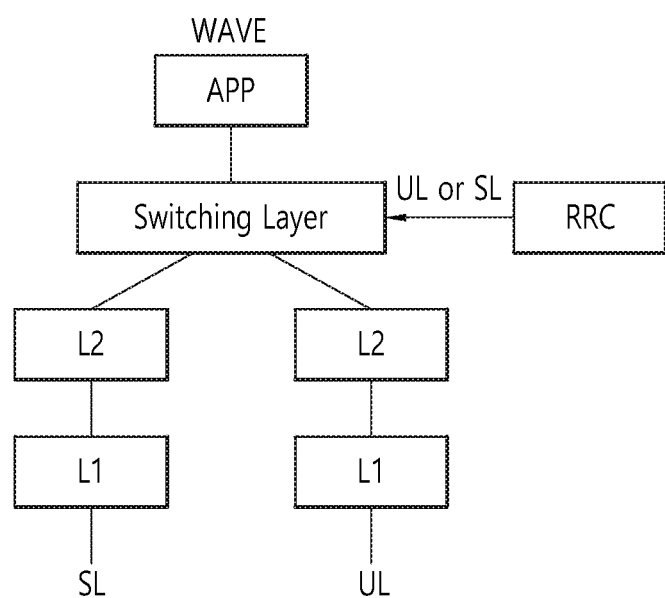
FIG. 13 shows an example of a switching layer performing switching control between UL and SL according to an embodiment of the present invention.

FIG. 13 shows an example of a switching layer performing switching control between UL and SL according to an embodiment of the present invention. Referring to FIG. 13, the application layer may provide V2X communication. According to an embodiment of the present invention, the switching layer may be added between the application layer and L2 (i.e. PDCP/RLC/MAC layer). The switching layer may perform switching control between UL and SL upon receiving control information for a transmission direction of the V2X communication. The control information may be received from the RRC layer. The control information may be described in detail below. The UE may perform V2X communication via the determined UL or SL by the switching layer.

Figure 14:
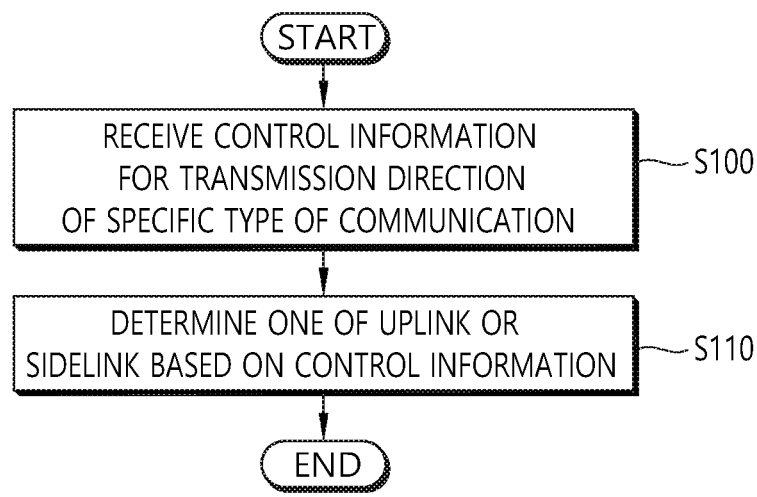
FIG. 14 shows a method for performing, by a UE, switching control between UL and SL according to an embodiment of the present invention.

FIG. 14 shows a method for performing, by a UE, switching control between UL and SL according to an embodiment of the present invention. The UE may a vehicle.

In step S100, the UE receives control information for a transmission direction of a specific type of communication from a network. The control information may indicate one of the UL or the SL. Or, the control information may include a probability factor for the transmission direction. Or, the control information may include a first probability factor for the UL and a second probability factor for the SL. The control information may be provided per RRC state. The control information may be received from a RRC layer of the UE. The specific type of communication may be a vehicular communication between vehicles or between a vehicle and other type of device. The other type of device is one of an eNB, a new entity for the vehicular communication, a new gateway for the vehicular communication, or a RSU.

In step S110, the UE determines one of the UL or the SL as the transmission direction of the specific type of communication based on the control information. When the control information may include a probability factor for the transmission direction, one of the UL or the SL may be determined based on the probability factor. One of the UL or the SL may be determined by comparing the probability factor with a random number. Determining one of the UL or the SL may be performed at a switching layer of the UE. The UE may perform the specific type of communication via the determined one of the UL or the SL. The data/message/signaling may be transmitted with a digital signature or encryption.

Based on the above description according to embodiments of the present invention, various methods for performing switching control between UL and SL according to embodiments of the present invention are described below.

Hereinafter, the connectionless transmission may be a specific type of UE-to-UE transmission via network. In connectionless transmission, data/message/signaling may not be routed to the S-GW, but it may be transferred from one or more UEs to one or more other UEs via network. The network node may be one of an eNB, a new entity for V2X communication, a new gateway for V2X communication, a RSU, etc. The network node may not be the MME or S-GW. Data/message/signaling may be specific to V2X communication, i.e. communication between vehicles or communication between a vehicle and other type of device. The connectionless transmission may be efficient for V2X communication, because connectionless transmission would not require connection establishment/management between the network and vehicles. Further, the bi-directional transmission may consist of UL transmission and SL transmission. In the bi-directional transmission, traffic may be transmitted in either UL or in SL. Or, in the bi-directional transmission, transmission from a UE to another UE may be performed in either UL or in SL.

Figure 15:
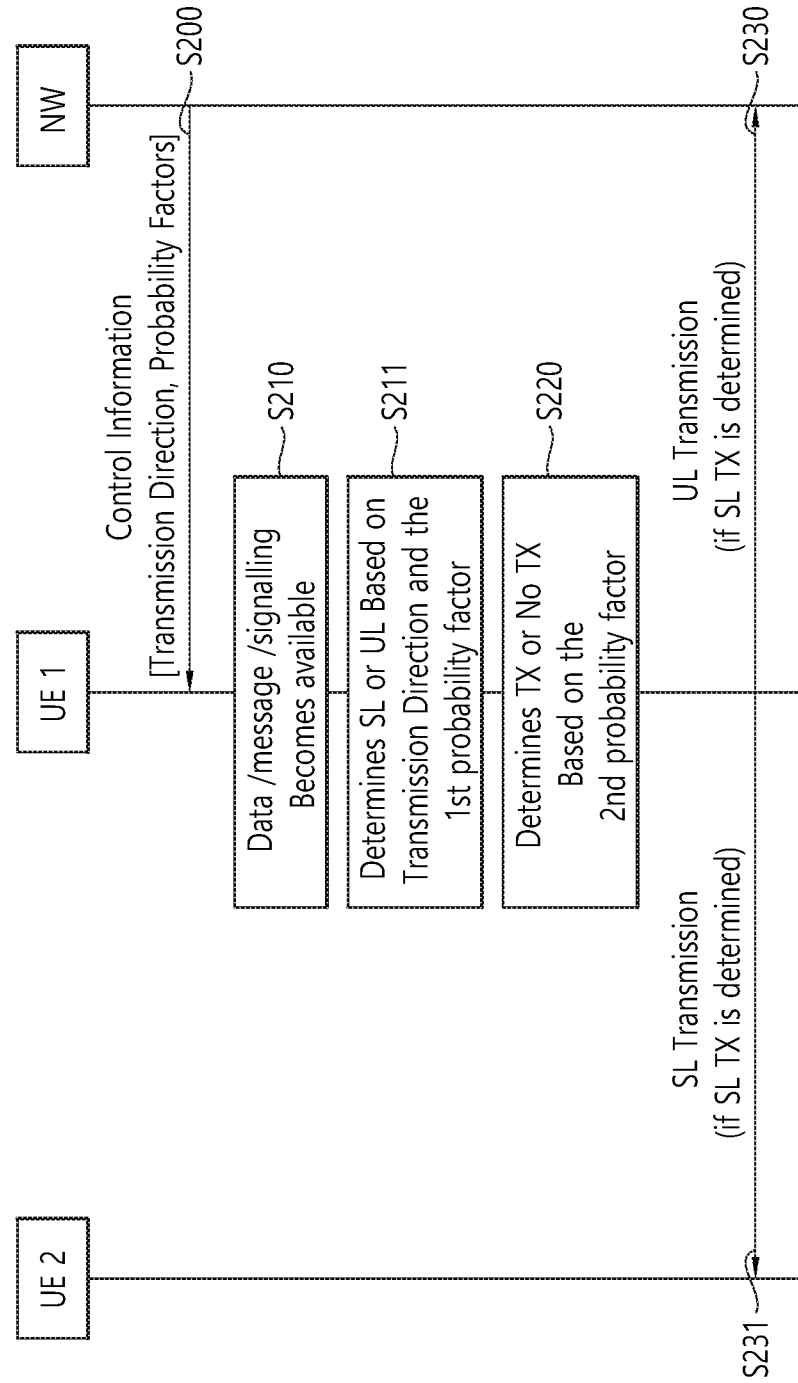
FIG. 15 shows a method for performing, by a UE, switching control between UL and SL according to another embodiment of the present invention.

FIG. 15 shows a method for performing, by a UE, switching control between UL and SL according to another embodiment of the present invention. The UE may a vehicle. In this embodiment, when data/message/signaling is available for bi-directional transmission (i.e. for both UL and SL), the UE may decide whether to perform UL transmission or to perform SL transmission based on control information received from the network, e.g. for each transmission, each MAC/RLC PDU, each message or each signaling. The control information received from the network may include transmission direction indication that indicates whether the UE perform UL transmission or SL transmission for the specific data or for the specific message/signaling, such as V2V messages related to road safety. The control information may be applicable only for UEs in RRC_CONNECTED or for UEs in RRC_IDLE. Different control information may be provided for UEs in RRC_CONNECTED and for UEs in RRC_IDLE. The control information may be broadcast on BCCH, signaled on a dedicated message on DCCH, or signaled on a MAC control element (CE). The control information may include a probability factor for transmission direction between UL and SL, so that the UE can select either UL or SL based on the probability factor.

In step S200, the UE receives control information from the network. The control information may include at least one of the following elements.

Transmission direction: The transmission direction may indicate whether the UE perform UL transmission or SL transmission for transmission of a specific data/message/signaling. That is, the transmission direction may indicate one of UL or SL. The transmission direction may be provided per RRC state or per PLMN serving UE, i.e. different information element sets may be provided for RRC_IDLE and RRC_CONNECTED.

Probability factor for transmission direction: The UE may use the probability factor to select one of UL transmission and SL transmission, e.g. for each PDU, each message or each signaling (or to select one of UL, SL and no transmission). The network may control the ratio of SL transmission over UL transmissions based on this probability factor.

Probability factor for UL transmission and/or a probability factor for SL transmission: The UE may use the probability factor to select either 'transmission' or 'no transmission', e.g. for each PDU, each message or each signaling. The UE may determine whether or not to perform the corresponding transmission for transmission of a specific data/message/signaling. The network may control the number of SL/UL transmissions based on this probability factor.

Different probability factors may be included for different use cases or for different message/signaling types.

In step S210, the UE detects that data/message/signaling becomes available for transmission. In step S211, the UE selects either UL transmission or SL transmission based on the transmission direction and/or probability factor for transmission direction, which may be included in the received control information. The UE may select one direction, e.g. for each transmission, each MAC/RLC PDU, each message, or each signaling. If the probability factor is received by the UE and so available in the UE, the UE may draw a random value and compare the probability factor with the random value. The UE may decide the transmission direction based on this comparison. Alternatively, the UE may select one of UL, SL or no transmission based the received control information.

If transmission direction is provided for RRC_IDLE, the UE may decide the transmission direction, if available, based on the probability factor while UE is in RRC_IDLE. While UE is in RRC_CONNECTED, the UE may not perform transmission, or the UE may always perform SL transmission, or the UE may always perform UL transmission. If transmission direction is provided for RRC_CONNECTED, the UE may decide the transmission direction, if available, based on the probability factor while UE is in RRC_CONNECTED. While UE is in RRC_IDLE, the UE may not perform transmission or the UE may always perform SL transmission. If transmission direction is provided without specific RRC state, the UE may decide the transmission direction, if available, based on the probability factor while UE is in any RRC state. If transmission direction is not provided, for either both RRC states or one of RRC states, the UE may not perform transmission or the UE may always perform SL transmission.

In step S220, the UE determines whether or not to perform the transmission on the selected transmission direction based on the probability factor, after the UE decides to perform UL transmission or SL transmission. For this process, the UE may draw a random value and compares the random value with the probability factor. The UE may determine whether or not to transmit on the selected transmission direction based on this comparison. Step S220 may be performed before step S211.

In step S230 and step S231, the UE perform transmission on the selected transmission direction, i.e. either UL (step S230) or SL (step S231), if UE decides to perform transmission on the selected transmission direction. The UE may repeat the transmission on the selected transmission direction, e.g. in PHY layer, MAC layer or RLC layer. During UL transmission, the UE may indicate to the network that this UL transmission is specific to the specific message/signaling such as V2X messages related to road safety. During SL transmission, the UE may indicate to another UE that this SL transmission is specific to the specific message/signaling such as V2X messages related to road safety. The SL transmission may be performed on one of SL channels, such as SL-SCH, SL-DCH and SL-BCH. The data/message/signaling may be transmitted with a digital signature or encryption.

Figure 16:
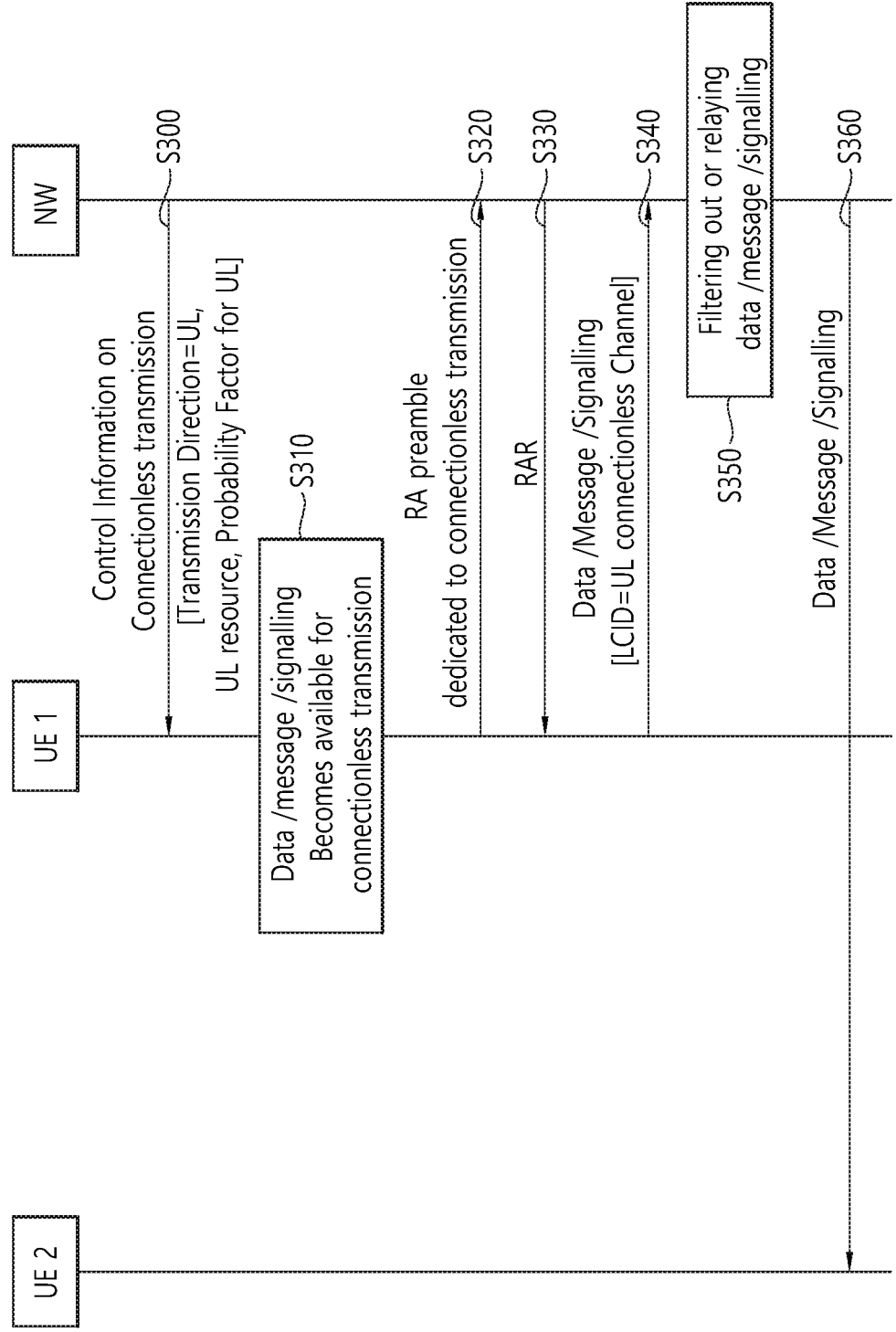
FIG. 16 shows a method for performing bi-directional transmission and/or connectionless transmission according to an embodiment of the present invention.

FIG. 16 shows a method for performing bi-directional transmission and/or connectionless transmission according to an embodiment of the present invention. According to this embodiment, bi-directional transmission and/or connectionless transmission may be performed for communication between UEs via network based on a random access. According to this embodiment, when data/message/signaling is available for bi-directional transmission and/or connectionless transmission, the UE may transmit a random access preamble dedicated to bi-directional transmission and/or connectionless transmission. Upon receiving the random access response, the UE may perform UL transmission and/or SL transmission indicating bi-directional transmission and/or connectionless transmission. In this embodiment, it is assumed that UL transmission is selected. The UE may be in RRC_IDLE or RRC_CONNECTED.

In step S300, the UE receives control information on bi-directional transmission and/or connectionless transmission at a cell. The control information may indicate that the cell supports bi-directional transmission and/or connectionless transmission. The control information may indicate transmission direction, if this transmission corresponds to bi-directional transmission by which the UE can transmit a packet in UL or in SL. The control information may include UL resource pool and/or SL resource pool, used for bi-directional transmission and/or connectionless transmission. The control information may further include a first probability factor controlling whether the UE selects UL or SL for bi-directional transmission and/or a second probability factor controlling whether or not the UE can perform connectionless transmission. The control information may include a set of random access preamble IDs and time resource for this set of preambles.

In step S310, the UE detects data available for bi-directional transmission and/or connectionless transmission. There may be a specific type of logical/transport channel for bi-directional transmission. There may be a specific logical/transport channel for connectionless transmission, which is called connectionless channel.

In step S320, the UE transmits a random access preamble ID dedicated to bi-directional transmission and/or connectionless transmission. Before this step, the UE may select UL or SL for bi-directional transmission based on the received first probability factor and/or determine whether or not to perform connectionless transmission based on the received second probability factor. As described above, in this embodiment, the UL transmission is selected.

In step S330, the UE receives a random access response including UL grant. The grant may be received on PDCCH/ePDCCH which includes a specific RNTI specific to bi-directional transmission. Or, the grant may include a specific RNTI specific to connectionless transmission (CL-RNTI).

In step S340, upon receiving the UL grant, the UE may perform UL transmission indicating bi-directional transmission and/or UL connectionless transmission to transmit the data/message/signaling. The data/message/signaling may be transmitted with a digital signature or encryption. Before this step, the UE may select UL or SL for bi-directional transmission based on the received first probability factor and/or determine whether or not to perform connectionless transmission based on the received second probability factor. As described above, in this embodiment, the UL transmission is selected.

Upon receiving data/message/signaling by UL connectionless transmission, in step S350, a network node (e.g. eNB) determines whether or not to relay the received data/message/signaling to one or more other UE(s) in the cell or in a specific area. The network node may receive similar data/message/signaling from many UEs in the cell from the same UL connectionless channel. The network node may detect duplicated data/message/signaling, so that the network node may not relay all the received ones. Rather, the network node may select one or some of the received ones for relaying. Alternatively, the network node may re-construct a new data/message/signaling based on the received ones, and transmit the re-constructed data/message/signaling to one or more other UEs in the cell or in a specific area.

In step S360, the network node may perform DL transmission either for relaying the received data/message/signaling or for transmitting new data/message/signaling re-constructed based on the received data/message/signaling.

Figure 17:
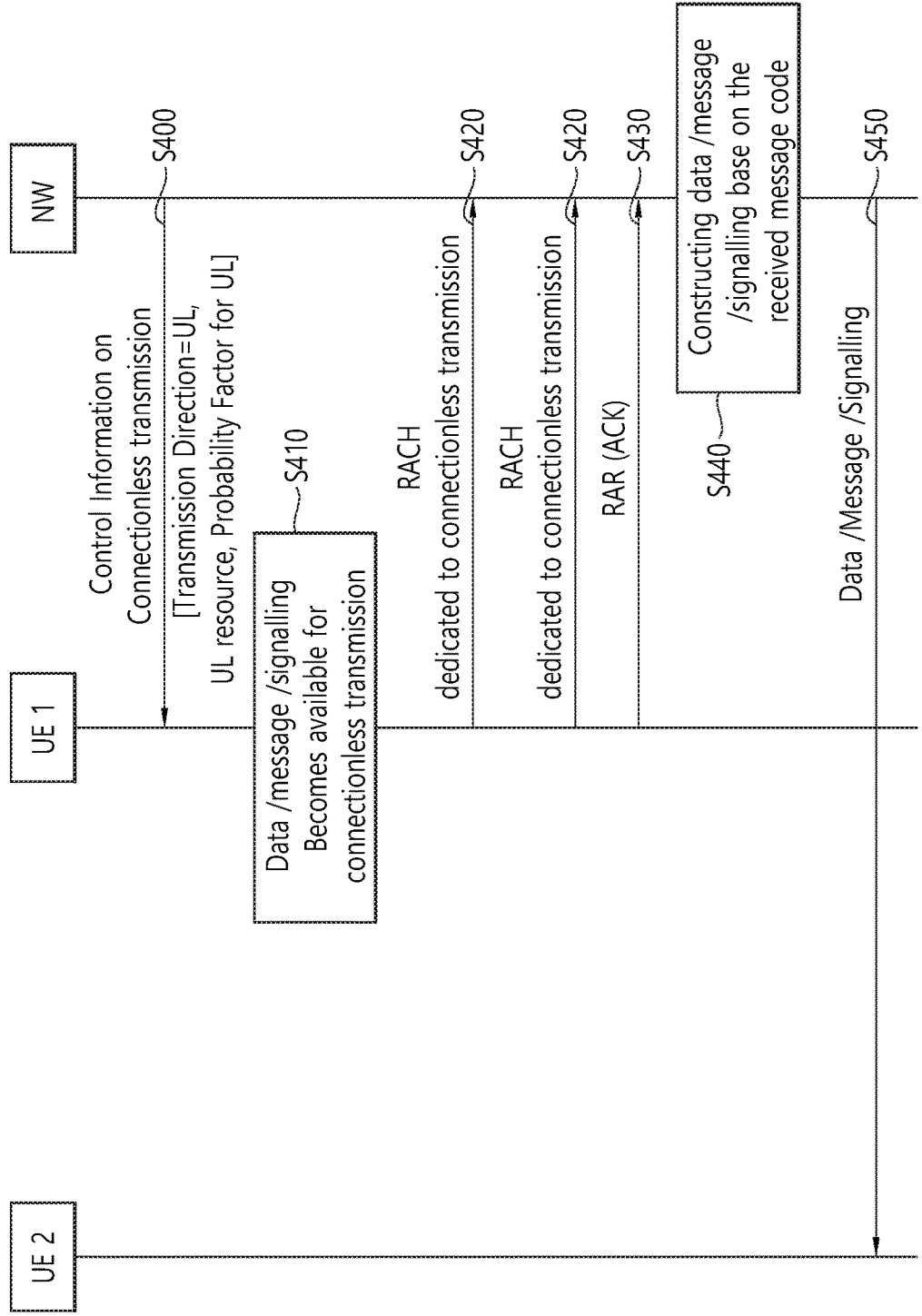
FIG. 17 shows a method for performing bi-directional transmission and/or connectionless transmission according to another embodiment of the present invention.

FIG. 17 shows a method for performing bi-directional transmission and/or connectionless transmission according to another embodiment of the present invention. This embodiment is similar to the embodiment described in FIG. 16, but some steps are modified compared with the embodiment described in FIG. 16. According to this embodiment, the UE may store a list of message codes. Each message code may be mapped to a specific message content/information.

Step S400 is the same as step S300 in FIG. 16. Step S410 is the same as step S310 in FIG. 16. In step S420, when data/message/signaling is available for bi-directional transmission and/or connectionless transmission, the UE transmits a specific message code based on contention-based or contention-free random access. In step S430, upon correctly receiving the specific message code, the network transmits acknowledge (ACK) to the UE either via random access response message or via physical HARQ indicator channel (PHICH). In step S440, the network node constructs a data/message/signaling based on the received message code. In step S450, the network node transmits the constructed data/message/signaling to another UE.

Figure 18:
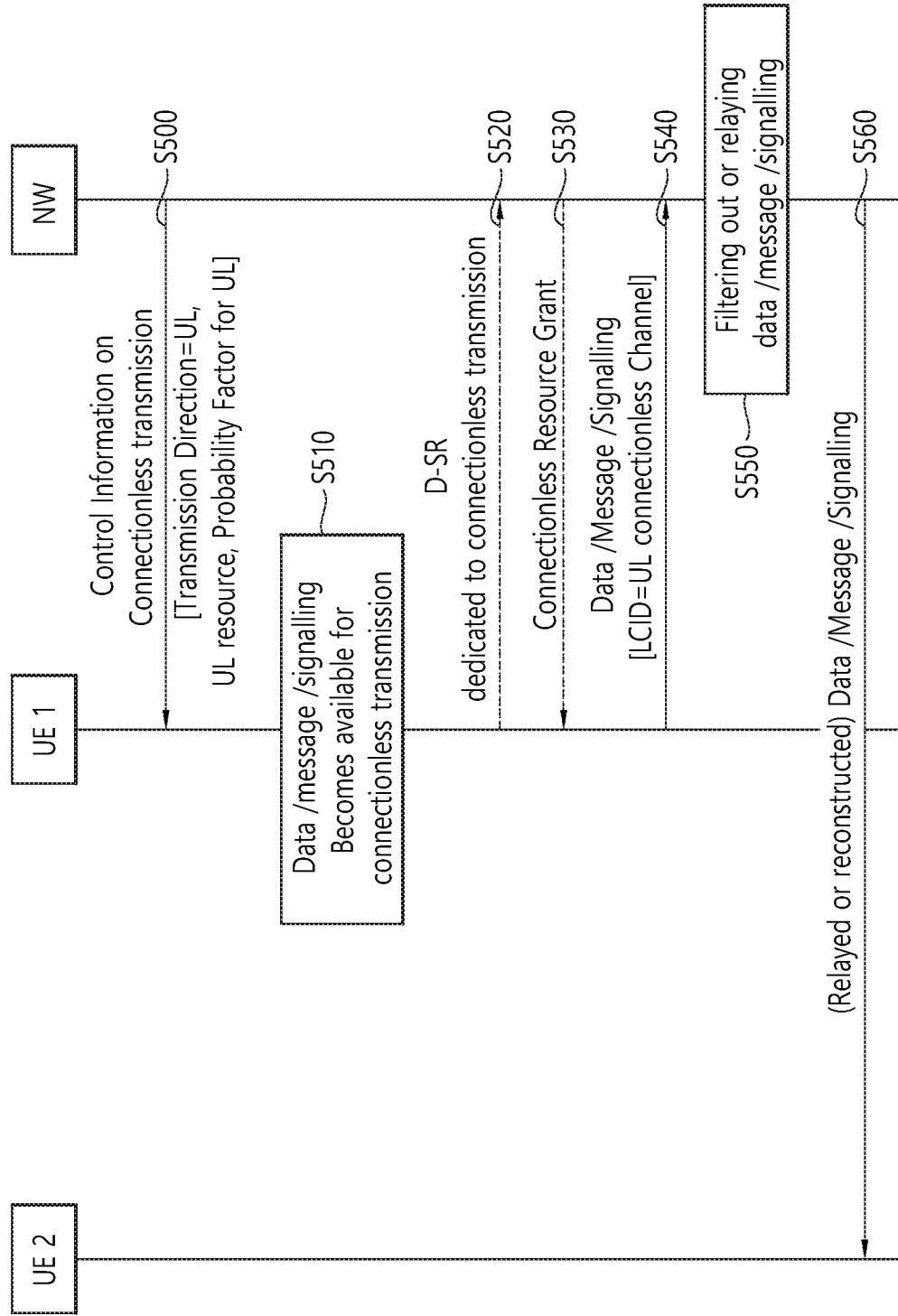
FIG. 18 shows a method for performing bi-directional transmission and/or connectionless transmission according to another embodiment of the present invention.

FIG. 18 shows a method for performing bi-directional transmission and/or connectionless transmission according to another embodiment of the present invention. According to this embodiment, bi-directional transmission and/or connectionless transmission may be performed for communication between UEs via network. According to this embodiment, when data/message/signaling is available for bi-directional transmission and/or connectionless transmission, the UE may perform bi-directional transmission and/or connectionless transmission of MAC PDU indicating bi-directional transmission and/or connectionless transmission, possibly by selecting a radio resource from a set of contention based resources which can be shared by UEs performing bi-directional transmission and/or connectionless transmission. The UE may transmit a scheduling request on PUCCH which is dedicated to bi-directional transmission and/or connectionless transmission, before bi-directional transmission and/or connectionless transmission. Upon receiving resource grant for bi-directional transmission and/or connectionless transmission, the UE may perform bi-directional transmission and/or connectionless transmission based on the received resource grant. In this embodiment, it is assumed that UL transmission is selected. The UE may be in RRC_CONNECTED.

In step S500, the UE receives control information on bi-directional transmission and/or connectionless transmission at a cell. The control information may indicate that the cell supports bi-directional transmission and/or connectionless transmission. The control information may indicate transmission direction, if this transmission corresponds to bi-directional transmission by which the UE can transmit a packet in UL or in SL. The control information may include UL resource pool and/or SL resource pool, used for bi-directional transmission and/or connectionless transmission. The control information may further include a first probability factor controlling whether the UE selects UL or SL for bi-directional transmission and/or a second probability factor controlling whether or not the UE can perform connectionless transmission. The control information may include a set of contention based resources in time and frequency.

In step S510, the UE detects data available for bi-directional transmission and/or connectionless transmission. There may be a specific type of logical/transport channel for bi-directional transmission. There may be a specific logical/transport channel for connectionless transmission, which is called connectionless channel.

In step S520, the UE may optionally transmit a scheduling request on PUCCH which is dedicated to bi-directional transmission and/or connectionless transmission. Before this step, the UE may select UL or SL for bi-directional transmission based on the received first probability factor and/or determine whether or not to perform connectionless transmission based on the received second probability factor. As described above, in this embodiment, the UL transmission is selected.

In step S530, the UE may optionally receive UL grant for bi-directional transmission and/or connectionless transmission. The grant may be received on PDCCH/ePDCCH which includes a specific RNTI specific to bi-directional transmission. Or, the grant may include a CL-RNTI.

In step S540, upon receiving the UL grant, the UE may select a radio resource from the set of contention based resources and performs UL transmission of MAC PDU indicating bi-directional transmission and/or UL connectionless transmission by using the selected resource in order to transmit the data/message/signaling. The LCID field in the header of the MAC PDU may include a specific value indicating bi-directional transmission and/or UL connectionless transmission. Before this step, the UE may select UL or SL for bi-directional transmission based on the received first probability factor and/or determine whether or not to perform connectionless transmission based on the received second probability factor. As described above, in this embodiment, the UL transmission is selected. The data/message/signaling may be transmitted with a digital signature or encryption.

Upon receiving data/message/signaling by UL connectionless transmission, in step S550, a network node (e.g. eNB) determines whether or not to relay the received data/message/signaling to one or more other UE(s) in the cell or in a specific area. The network node may receive similar data/message/signaling from many UEs in the cell from the same UL connectionless channel. The network node may detect duplicated data/message/signaling, so that the network node may not relay all the received ones. Rather, the network node may select one or some of the received ones for relaying. Alternatively, the network node may re-construct a new data/message/signaling based on the received ones, and transmit the re-constructed data/message/signaling to one or more other UEs in the cell or in a specific area.

In step S560, the network node may perform DL transmission either for relaying the received data/message/signaling or for transmitting new data/message/signaling re-constructed based on the received data/message/signaling.

Figure 19:
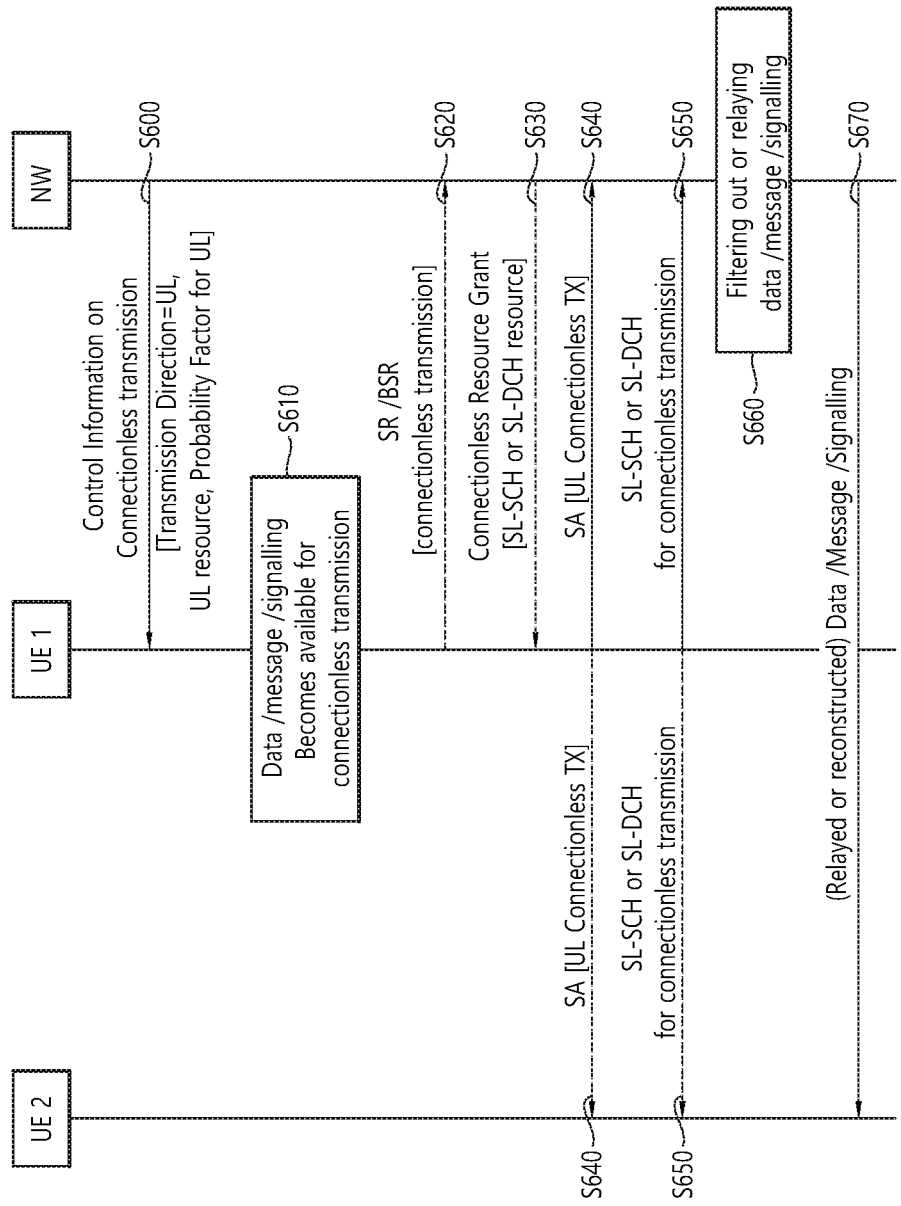
FIG. 19 shows a method for performing bi-directional transmission and/or connectionless transmission according to another embodiment of the present invention.

FIG. 19 shows a method for performing bi-directional transmission and/or connectionless transmission according to another embodiment of the present invention. According to this embodiment, connectionless bi-directional transmission between UEs via network may be performed on SL-SCH or SL-DCH. According to this embodiment, when data/message/signaling is available for connectionless bi-directional transmission, the UE may transmit UL data on a SL channel such as SL-SCH or SL-DCH under network control.

In step S600, the UE receives control information on connectionless bi-directional transmission at a cell. The control information may indicate that the cell supports connectionless transmission. The control information may indicate transmission direction, if this transmission corresponds to bi-directional transmission by which the UE can transmit a packet in UL or in SL. The control information may include UL resource pool for connectionless transmission. The control information may further include a first probability factor controlling whether the UE selects UL or SL for bi-directional transmission and/or a second probability factor controlling whether or not the UE can perform connectionless transmission. The control information may include a set of SL TX resources which can be also used for UL transmission towards the network.

In step S610, the UE detects data available for bi-directional transmission and/or connectionless transmission. There may be a specific type of logical/transport channel for bi-directional transmission. There may be a specific logical/transport channel for connectionless transmission, which is called connectionless channel.

In step S620, the UE may transmit a scheduling request on PUCCH which is dedicated to connectionless bi-directional transmission. The UE may further transmit a buffer status report for connectionless bi-directional transmission. Before this step, the UE may select UL or SL for bi-directional transmission based on the received first probability factor and/or determine whether or not to perform connectionless transmission based on the received second probability factor.

In step S630, the UE may receive SL grant or SL TX resources for UL connectionless bi-directional transmission towards the network (possibly as well as SL transmission towards another UE(s)). The SL grant or the SL TX resource may include resources for transmission of scheduling assignment and SL-SCH. Or, the SL grant or the SL TX resource may include resources for transmission of SL-DCH. Or, the SL grant or the SL TX resource may include resources for transmission of SL-BCH. The SL grant may be received on PDCCH/ePDCCH which includes a specific RNTI specific to bi-directional transmission. Or, the grant may include a CL-RNTI.

Upon receiving the SL grant or the SL TX resource, in step S640, the UE may perform transmission of scheduling assignment that schedules transmission of the data/message/signaling towards the network. Another UE may also receive this scheduling assignment. The LCID field in the header of the MAC PDU may include a specific value indicating UL connectionless bi-directional transmission. Before this step, the UE may select UL or SL for bi-directional transmission based on the received first probability factor and/or determine whether or not to perform connectionless transmission based on the received second probability factor.

Upon receiving the SL grant or the SL TX resource, in step S650, the UE may perform UL transmission of MAC PDU via one of SL channels (such as SL-SCH, SL-DCH, SL-BCH) based on the SA in order to transmit the data/message/signaling to the network. Another UE may also receive this MAC PDU on the SL channel. The LCID field in the header of the MAC PDU may include a specific value indicating UL connectionless bi-directional transmission. Before this step, the UE may select UL or SL for bi-directional transmission based on the received first probability factor and/or determine whether or not to perform connectionless transmission based on the received second probability factor. The data/message/signaling may be transmitted with a digital signature or encryption.

Upon receiving data/message/signaling by UL connectionless transmission, in step S660, a network node (e.g. eNB) determines whether or not to relay the received data/message/signaling to one or more other UE(s) in the cell or in a specific area. The network node may receive similar data/message/signaling from many UEs in the cell from the same UL connectionless channel. The network node may detect duplicated data/message/signaling, so that the network node may not relay all the received ones. Rather, the network node may select one or some of the received ones for relaying. Alternatively, the network node may re-construct a new data/message/signaling based on the received ones, and transmit the re-constructed data/message/signaling to one or more other UEs in the cell or in a specific area.

In step S670, the network node may perform DL transmission either for relaying the received data/message/signaling or for transmitting new data/message/signaling re-constructed based on the received data/message/signaling.

Hereinafter, the present invention is described in further detail.

As described above, the switching layer may be allocated at the UE. Herein, the switching layer may determines that transmission link of data would be changed, if a predetermined condition is satisfied. When the switching layer determines that the transmission link of the data has changed, there may be a problem of how to process the data in the transmission buffer for the transmission link.

In order to solve the problem, in this invention, a method for operating the transmission buffer for the transmission link and the transmission buffer for the switching layer is provided. More specifically, in this invention, if the switching layer detects that the set of conditions to trigger transmission link change is fulfilled, it re-passes the data stored in its transmission buffer to another transmission link that is allowed for use.

To enable this, in this invention, when the switching layer receives from upper layer data to transmit, it buffers the data in its transmission buffer. The switching layer buffers the data until it identifies that transmission of the data is successfully complete.

The switching layer buffers (stores) the data until defined period of time or until confirming that the transmission in lower layer is successful, whichever is earlier, since it receives the data from the upper layer (e.g. application layer, etc.). Upon expiry of the defined time, the switching layer discards the data.

Figure 20:
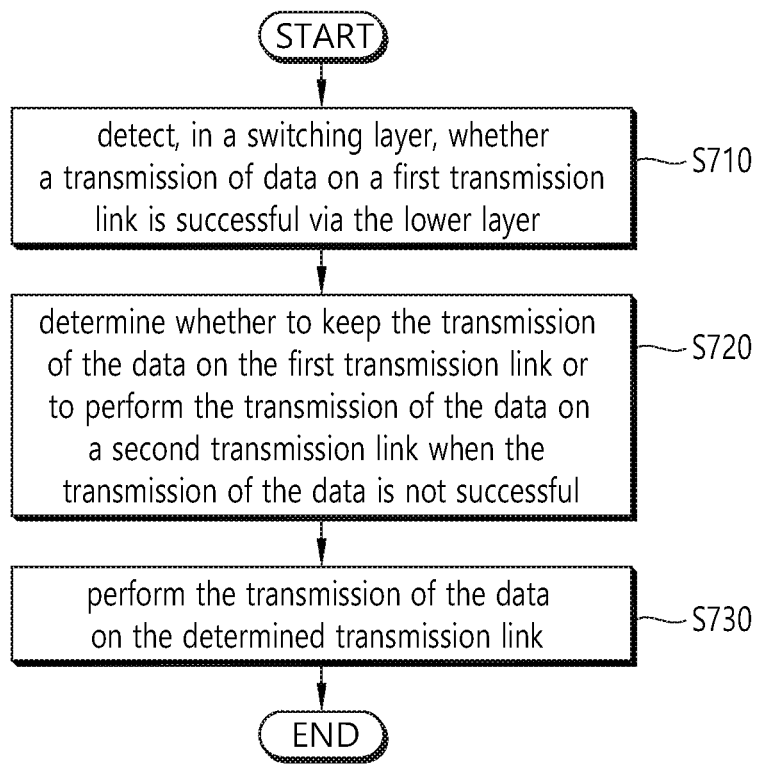
FIG. 20 shows a method for operating a transmission buffer in a wireless communication system according to an embodiment of the present invention.

FIG. 20 shows a method for operating a transmission buffer in a wireless communication system according to an embodiment of the present invention.

According to the FIG. 20, the UE detects, in a switching layer, whether a transmission of data on a first transmission link is successful via the lower layer (S710). The lower layer may indicate to the switching layer whether the transmission of the data on the first transmission link is successful via the lower layer. The lower layer may be a layer in which the first transmission link and the second transmission link are branched and distinguished. And, the lower layer, in which the first transmission link and the second transmission link are branched and distinguished, may be indicating layer. The UE may be a Vehicle to X (V2X) UE and the data may be V2X data.

More specifically, at least one layer placed lower than the switching layer indicates to the switching layer whether transmission of the data is successfully complete or not. The indicating layer can be PDCP layer or RLC layer or MAC layer or PHY layer.

In case the indicating layer is RLC layer, the RLC layer may indicate to the switching layer a failure or a success of transmission at RLC. The failure of transmission may mean that maximum RLC retransmissions has reached and/or exceeded.

In case the indicating layer is MAC layer, the MAC layer may indicate to the switching layer a failure or a success of transmission at MAC. The failure of transmission may mean that maximum retransmissions of the concerned transport block has reached or that the maximum number of random access transmission (e.g. preamble transmission) has reached/exceeded.

Moreover, the indicating layer may directly indicate (or inform) to the application layer that generates the data to transmit that the whether the transmission of the data is successful.

When lower layer indicates to the switching layer whether transmission is successful or not, the indicating layer may also indicate the transmission link used for the attempted transmissions. For example, the indicated transmission link can be uplink (UL) or sidelink (SL) or both (UL and DL).

The lower layer may know whether the transmission of the data on the uplink (that is, the wireless link between the UE and the base station), and the lower layer may inform (or indicates) whether the transmission of the data on the uplink. Moreover, The lower layer may know whether the transmission of the data on the sidelink (which is used for D2D operation or V2X operation), and the lower layer may inform (or indicate) whether the transmission of the data on the sidelink.

Note that the switching layer may be called 'transmission link selection and management layer'.

The UE determines whether to keep the transmission of the data on the first transmission link or to perform the transmission of the data on a second transmission link when the transmission of the data is not successful (S720). For example, the first transmission link may be an uplink and the second transmission link may be a sidelink, and if the transmission of the data on the uplink is not successful via the lower layer, the UE determines to perform the transmission of the data on the sidelink. For example, the first transmission link is a sidelink and the second transmission link is an uplink, and if the transmission of the data on the sidelink is not successful via the lower layer, the UE determines to perform transmission of the data on the uplink.

More specifically, UE can be configured with one or more transmission links that the UE can dynamically select for transmissions. For example, the UE can change the transmission link to another link upon detection of transmission failure or upon detection of high risk of transmission failure on a current transmission link.

For example, UE can be configured such that UE is allowed to transmit data using uplink in a normal case (i.e. uplink is the default transmission link) and the UE is allowed to transmit data using sidelink in abnormal cases defined by a set of conditions (i.e. sidelink is the exceptional transmission link, allowed for use in exceptional cases).

For another example, UE can be configured such that UE is allowed to transmit data using sidelink in a normal case (i.e. sidelink is the default transmission link) and the UE is allowed to transmit data using uplink in abnormal cases defined by a set of conditions (i.e. uplink is the exceptional transmission link, allowed for use in exceptional cases).

The UE performs the transmission of the data on the determined transmission link (S730). Herein, to control transmission operations, the UE may operate a transmission buffer for the switching layer and a transmission buffer for each transmission link that can be used for transmission. The data to transmit is stored in the transmission buffer of the transmission link chosen for the transmission. Since the UE can dynamically change its transmission link, the UE should carefully manage its transmission buffers in order to avoid transmission packet loss that could happen during a change of the transmission link.

More specifically, if the switching layer detects that transmission of the data that was previously passed to lower layer is NOT successful for a given transmission link that was used for the attempted transmissions, the switching layer passes the data stored in its transmission buffer to another transmission link.

If the switching layer detects that transmission of the data that was previously passed to lower layer is successful for a given transmission link that was used for the attempted transmissions, the switching layer discards the data from its transmission buffer.

If the switching layer detects that transmission of the data that was previously passed to lower layer is not successful or if the switching layer discards the data in its transmission buffer, two alternative behaviors are possible for lower layer behaviors and transmission link selection for further transmissions:

a) It stops using the transmission link for which the transmission failed. To enable this, the switching resets the transmission buffer of the lower layers in charge of transmission of the data in that lower layer, e.g. RLC transmission buffer or HARQ TX buffer, or equivalently, it requests the lower layer(s) to reset the transmission buffer(s).

UE then cancels BSR (Buffer Status Report) for the transmission over the transmission link for which the transmission failed, if the BSR is pending.

If the transmission buffer of the lower layer(s) contains the concerned data (e.g. V2X) subject to the control of the switching layer as well as other data that is not subject to the control of the switching layer (e.g. data to be sent over UL), the switching layer does not reset or does not request the lower layer to reset the concerned transmission buffer so that transmission of other data is not interrupted.

b) It keeps using the transmission link for which the transmission has failed. To enable this, the switching layer keeps passing to lower layer(s) data to transmit.

As described above, the first transmission link may be a sidelink and the second transmission link may be an uplink, and if the transmission of the data on the sidelink is not successful via the lower layer, the UE may determine to perform the transmission of the data on the uplink.

Figure 21:
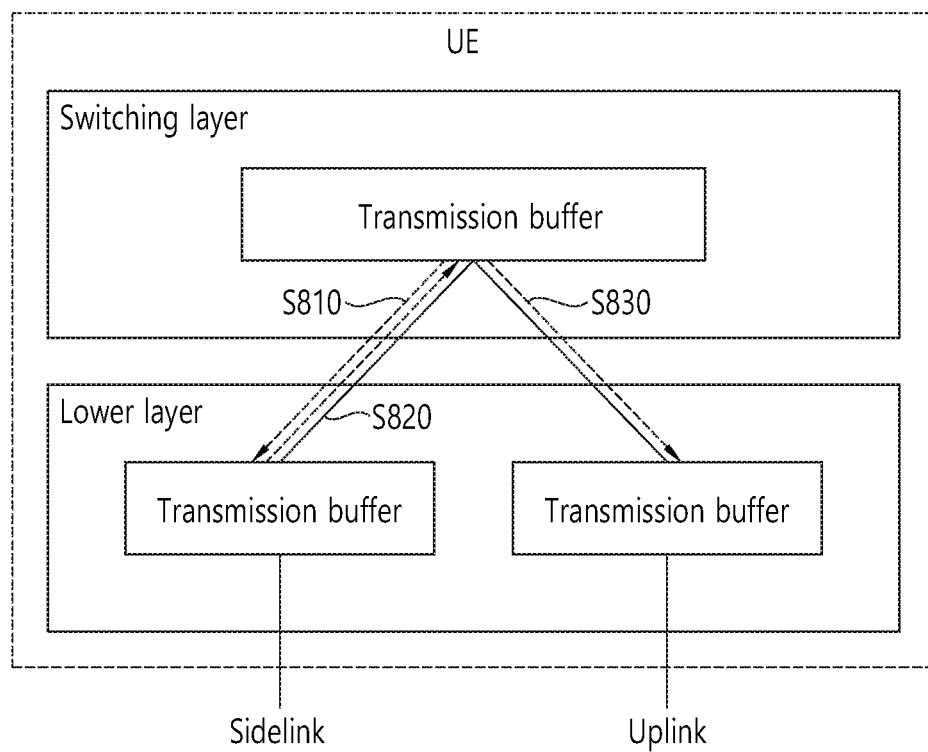
FIG. 21 shows a method for operating a transmission buffer in a wireless communication system according to another embodiment of the present invention.

FIG. 21 shows a method for operating a transmission buffer in a wireless communication system according to another embodiment of the present invention.

According to the FIG. 21, the UE pass the data from the transmission buffer for the switching layer to the transmission buffer for the sidelink (S810). Herein, specific contents of the transmission buffer, switching layer, and/or the lower layer is as described above.

If the transmission of the data is failed on the sidelink, the lower layer of the UE informs (to the switching layer) that the transmission of the data on the sidelink is unsuccessful (S820). That is, the UE detect that the transmission of the data on the sidelink is unsuccessful via the lower layer. Herein, specific contents of the procedure for informing the failure is as described above.

If the UE detects that the transmission of the data on the sidelink is unsuccessful, the UE transmits (or pass down) the data, which is stored in the transmission buffer of the switching layer, to the transmission buffer of the uplink (S830). Herein, specific contents of the stored data, the transmission buffer of the switching layer, and/or the transmission buffer of the lower layer is as described above.

The switching of transmission link does not necessarily require the UE to operate a separate transmission buffer for the switching layer. In case UE does not have a separate transmission buffer for the switching layer, if UE detects transmission failure of data (or SDU), the transmission buffer for the link used for the transmission of the data (or SDU) can directly pass the data (or SDU), to another transmission link.

The above description will be described in the following flowchart.

Figure 22:
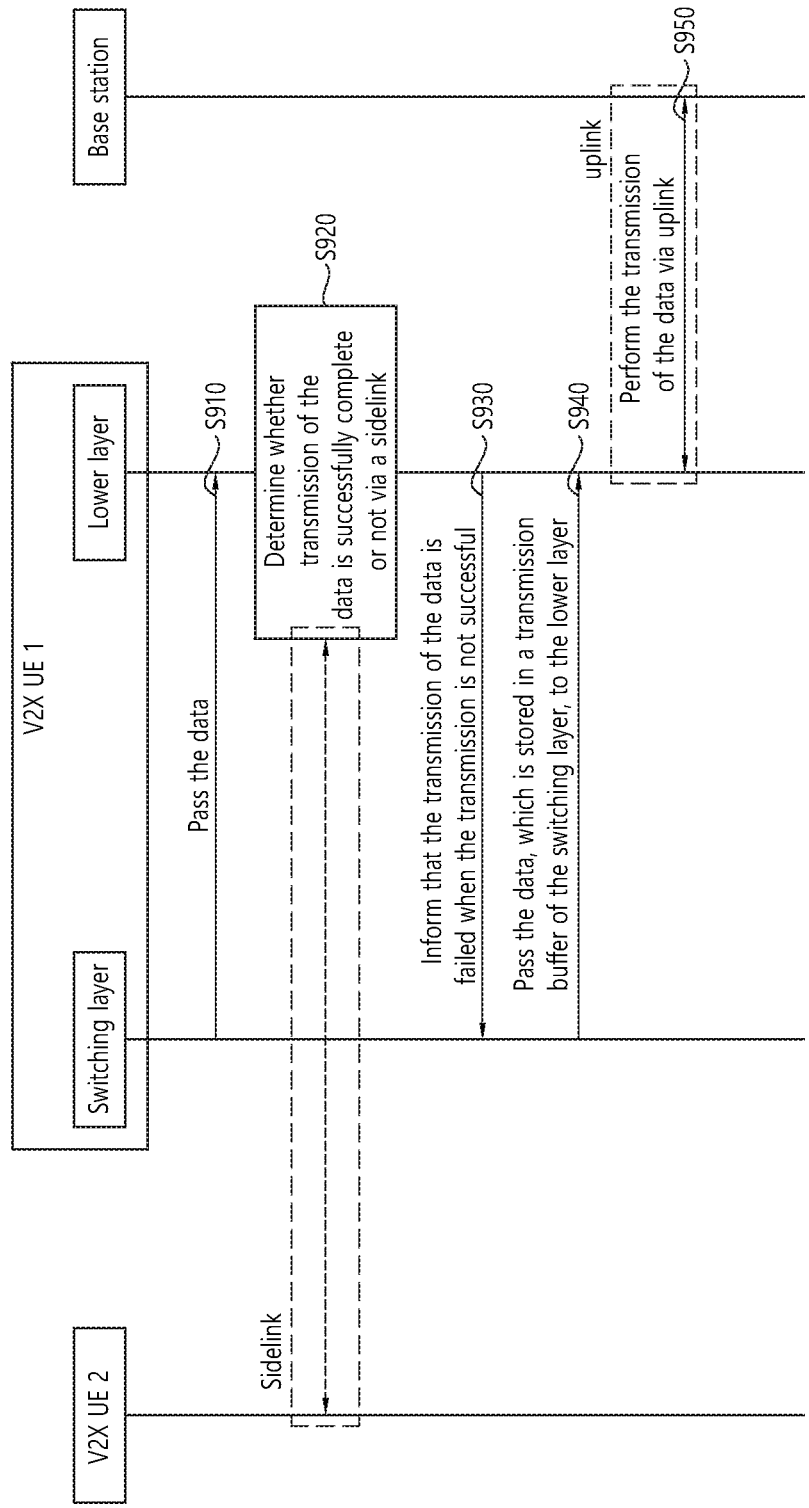
FIG. 22 shows a method for operating a transmission buffer in a wireless communication system according to another embodiment of the present invention.

FIG. 22 shows a method for operating a transmission buffer in a wireless communication system according to another embodiment of the present invention.

According to the FIG. 22, in the switching layer, the UE pass the data to the lower layer of the UE (S910).

In the lower layer, the UE determines whether transmission of the data is successfully complete or not via a sidelink (S920).

If the transmission is not successful, in the lower layer, the UE informs (to the switching layer) that the transmission of the data is failed (S930).

Then, in the switching layer, the UE pass the data, which is stored in a transmission buffer of the switching layer, to the lower layer (S940).

The UE perform the transmission of the data on the uplink via the lower layer (S950).

As described above, the first transmission link may be an uplink and the second transmission link may be a sidelink, and if the transmission of the data on the uplink is not successful via the lower layer, the UE may determine to perform the transmission of the data on the sidelink.

Figure 23:
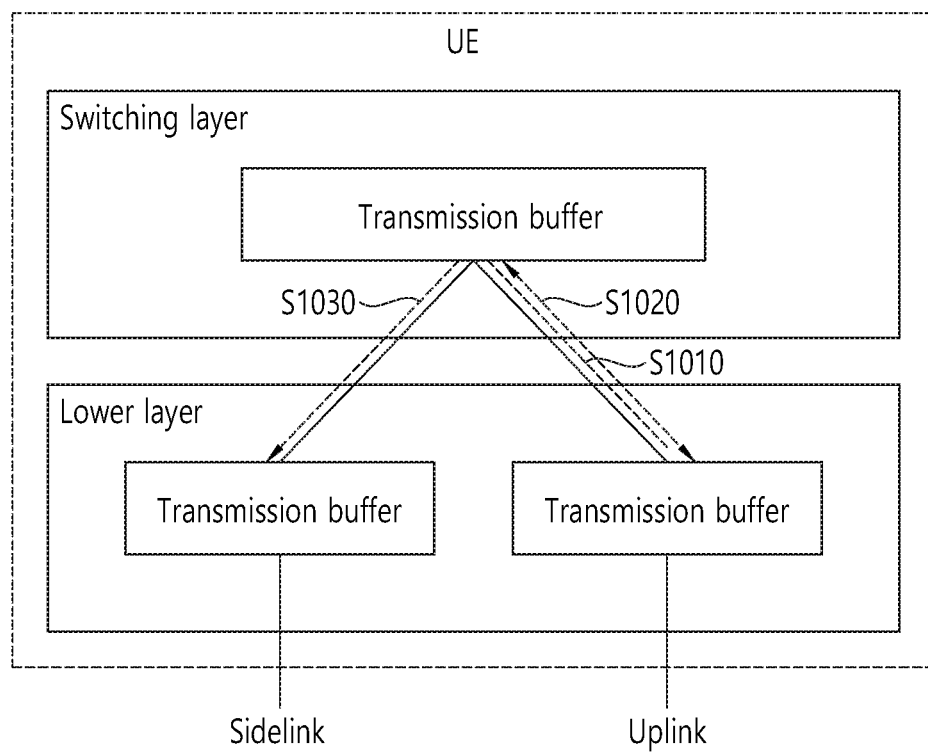
FIG. 23 shows a method for operating a transmission buffer in a wireless communication system according to another embodiment of the present invention.

FIG. 23 shows a method for operating a transmission buffer in a wireless communication system according to another embodiment of the present invention.

According to the FIG. 23, the UE pass the data from the transmission buffer for the switching layer to the transmission buffer for the uplink (S1010). Herein, specific contents of the transmission buffer, switching layer, and/or the lower layer is as described above.

If the transmission of the data is failed on the uplink, the lower layer of the UE informs (to the switching layer) that the transmission of the data on the uplink is unsuccessful (S1020). That is, the UE detect that the transmission of the data on the uplink is unsuccessful via the lower layer. Herein, specific contents of the procedure for informing the failure is as described above.

If the UE detects that the transmission of the data on the uplink is unsuccessful, the UE transmits the stored data, which is stored in the transmission buffer of the switching layer, to the transmission buffer of the sidelink (S1030). Herein, specific contents of the stored data, the transmission buffer of the switching layer, and/or the transmission buffer of the lower layer is as described above.

The above description will be described in the following flowchart.

Figure 24:
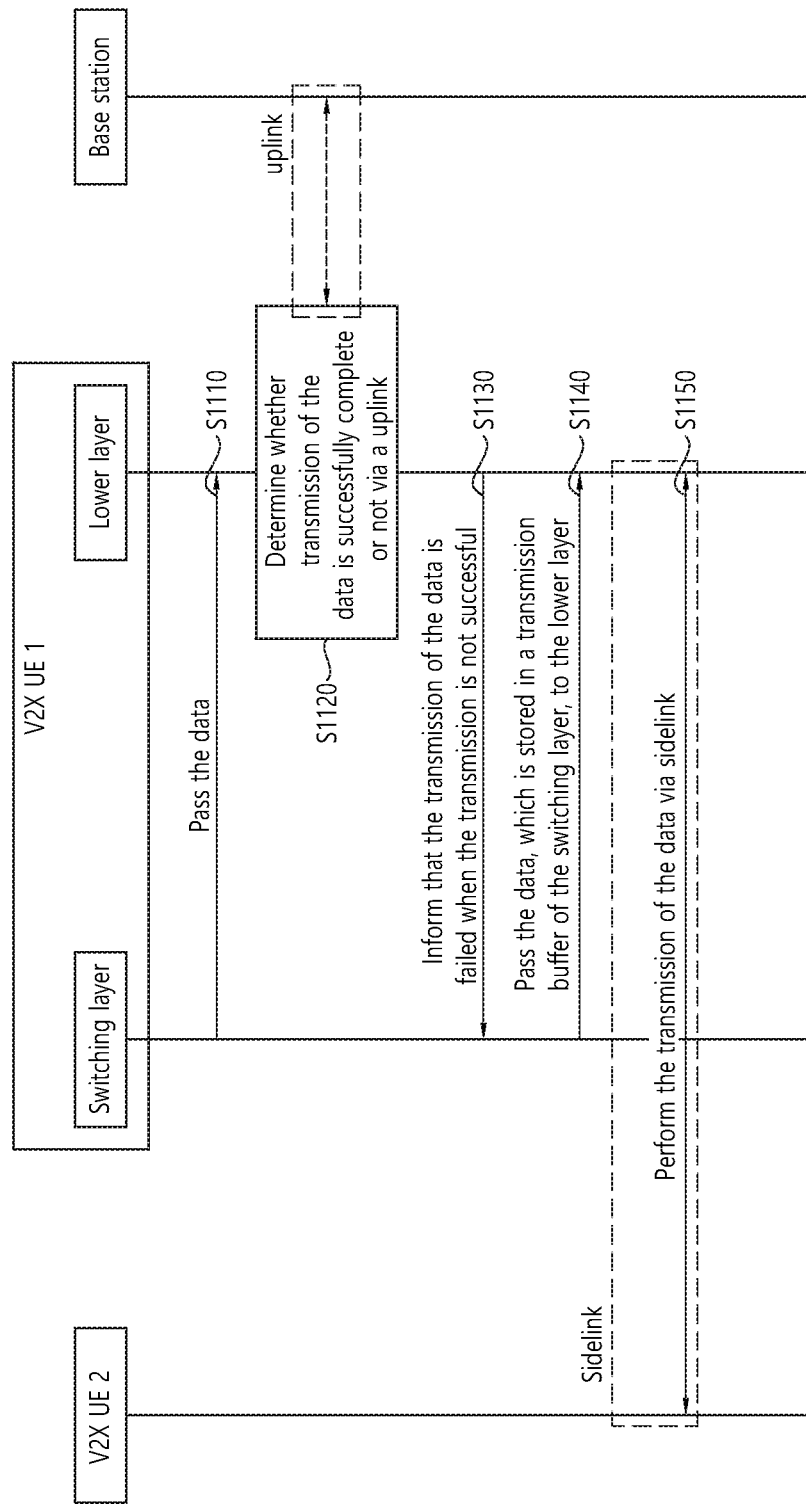
FIG. 24 shows a method for operating a transmission buffer in a wireless communication system according to another embodiment of the present invention.

FIG. 24 shows a method for operating a transmission buffer in a wireless communication system according to another embodiment of the present invention.

According to the FIG. 24, in the switching layer, the UE pass the data to the lower layer of the UE (S1110).

In the lower layer, the UE determines whether transmission of the data is successfully complete or not via a uplink (S1120).

If the transmission is not successful, in the lower layer, the UE informs (to the switching layer) that the transmission of the data is failed (S1130).

Then, in the switching layer, the UE pass the data, which is stored in a transmission buffer of the switching layer, to the lower layer (S1140).

The UE perform the transmission of the data on the sidelink via the lower layer (S1150).

Figure 25:
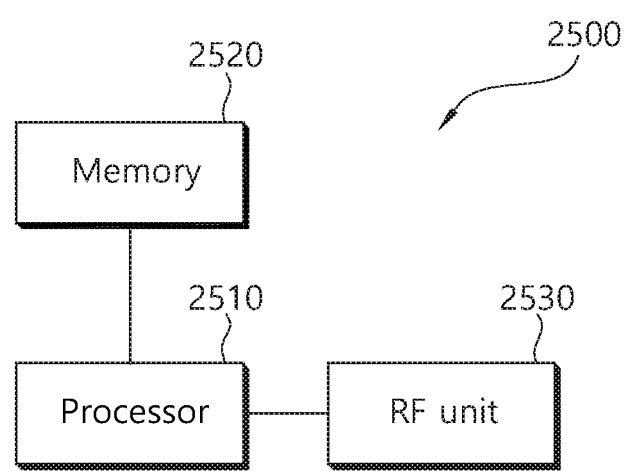
FIG. 25 is a block diagram representing the terminal in which the embodiment of the present invention is implemented.

FIG. 25 is a block diagram representing the terminal in which the embodiment of the present invention is implemented.

Referring to FIG. 25, the terminal 1200 includes a processor 1210, a memory 1220 and a RF unit (radio frequency unit) 1230. The processor 1210 implements the suggested function, process, and/or method. For example, the processor 1210 detects, in a switching layer, whether a transmission of data on a first transmission link is successful via the lower layer. The processor 1210 determines whether to keep the transmission of the data on the first transmission link or to perform the transmission of the data on a second transmission link when the transmission of the data is not successful. The processor 1210 performs the transmission of the data on the determined transmission link. Herein, the UE operates a transmission buffer for the switching layer and a transmission buffer for the determined transmission link when performing the transmission of the data.

The processor 1210 may perform the above mentioned methods.

The RF unit 1230 is coupled with the processor 1210, and transmits and/or receives a radio signal.

The processor 1210 may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

What is claimed is:

1. A method for performing a transmission of data in a wireless communication system, the method performed by a user equipment (UE) and comprising:
    detecting, in a switching layer of the UE via a lower layer of the UE, whether the transmission of the data on a sidelink is successful; and
    performing the transmission of the data based on whether to keep the transmission of the data on the sidelink or to perform the transmission of the data on an uplink when the transmission of the data is not successful,
    wherein the lower layer is a first layer in which the sidelink and the uplink are branched and distinguished,
    wherein the lower layer informs, to the switching layer, whether the transmission of the data on the sidelink is successful, and
    wherein the switching layer stores the data in a transmission buffer for the switching layer until the switching layer identifies that the transmission of the data is successfully complete.

2. The method of claim 1, wherein, when the UE performs the transmission of the data on the uplink, the UE resets a transmission buffer for the sidelink.

3. The method of claim 2, wherein the UE cancels a Buffer Status Report (BSR) of the sidelink.

4. The method of claim 2, wherein the UE passes the data stored in the transmission buffer for the switching layer to a transmission buffer for the uplink.

5. The method of claim 1, wherein when a transmission buffer for the sidelink or a transmission buffer for the uplink contains data related to control for the switching layer as well as data not related to control for the switching layer, the UE does not reset the transmission buffer for the sidelink or the transmission buffer for the uplink.

6. The method of claim 1,
    wherein if the transmission of the data on the sidelink is not successful, the UE determines to perform the transmission of the data on the uplink.

7. The method of claim 1, wherein the lower layer is a Packet Data Convergence Protocol (PDCP) layer, a Radio Link Control (RLC) layer, a Medium Access Control (MAC) layer, or a Physical (PHY) layer.

8. The method of claim 1, wherein the lower layer is a transmission link selection and management layer.

9. The method of claim 1, wherein the UE is a Vehicle to X (V2X) UE and the data is V2X data.

10. A user equipment (UE) for performing a transmission of data, the UE comprising:
    a transceiver configured to transmit and receive a radio signal;
    at least one processor coupled to the transceiver; and
    at least one computer memory operably connectable to the at least one processor and storing instructions that, when executed, cause the at least one processor to perform operations comprising:
    detecting, in a switching layer of the UE via a lower layer of the UE, whether the transmission of the data on a sidelink is successful; and
    performing the transmission of the data based on whether to keep the transmission of the data on the sidelink or to perform the transmission of the data on an uplink when the transmission of the data is not successful,
    wherein the lower layer is a first layer in which the sidelink and the uplink are branched and distinguished,
    wherein the lower layer informs, to the switching layer, whether the transmission of the data on the sidelink is successful, and
    wherein the switching layer stores the data in a transmission buffer for the switching layer until the switching layer identifies that the transmission of the data is successfully complete.

* * * * *